United States Patent
Tokumitsu

(10) Patent No.: US 6,829,777 B2
(45) Date of Patent: Dec. 7, 2004

(54) TURN TABLE AND OPTICAL DISK USING THE TURN TABLE

(75) Inventor: Shunji Tokumitsu, Tokyo (JP)

(73) Assignee: Sony Corporation (JP)

( * ) Notice: Subject to any disclaimer, the term of this patent is extended or adjusted under 35 U.S.C. 154(b) by 167 days.

(21) Appl. No.: 10/257,780

(22) PCT Filed: Apr. 17, 2001

(86) PCT No.: PCT/JP01/03291

§ 371 (c)(1),
(2), (4) Date: Oct. 17, 2002

(87) PCT Pub. No.: WO01/80232

PCT Pub. Date: Oct. 25, 2001

(65) Prior Publication Data

US 2003/0076774 A1 Apr. 24, 2003

(30) Foreign Application Priority Data

Apr. 17, 2000 (JP) .................................... 2000-121084
May 8, 2000 (JP) .................................... 2000-139423

(51) Int. Cl.[7] ............................................. G11B 17/028
(52) U.S. Cl. ....................................................... 720/717
(58) Field of Search ................................ 720/703, 704, 720/706, 707, 710, 715, 716, 717; 369/264, 270, 271

(56) References Cited

U.S. PATENT DOCUMENTS

| | | | | | |
|---|---|---|---|---|---|
| 4,730,300 A | * | 3/1988 | Kamoshita et al. | .......... | 369/270 |
| 4,791,624 A | * | 12/1988 | Stinesen | .......... | 369/270 |
| 5,633,856 A | * | 5/1997 | Mukawa | .......... | 369/270 |
| 6,208,613 B1 | * | 3/2001 | Iizuka | .......... | 369/271 |
| 6,222,818 B1 | * | 4/2001 | Kobayashi et al. | .......... | 369/271 |
| 6,363,048 B1 | * | 3/2002 | Wu et al. | .......... | 369/271 |
| 6,496,472 B1 | * | 12/2002 | Liao et al. | .......... | 369/264 |

FOREIGN PATENT DOCUMENTS

| | | |
|---|---|---|
| JP | 58-39790 | 9/1956 |
| JP | 58-143476 | 8/1983 |
| JP | 59-75471 | 4/1984 |
| JP | 59-189788 | 12/1984 |
| JP | 61-253664 | 11/1986 |
| JP | 62-124652 | 8/1987 |
| JP | 63-65152 | 4/1988 |
| JP | 63-118741 | 8/1988 |
| JP | 2-103766 | 4/1990 |
| JP | 2-227860 | 9/1990 |
| JP | 2-45255 | 10/1990 |
| JP | 2-140655 | 11/1990 |
| JP | 9-198757 | * 7/1997 |
| JP | 10-122251 | * 5/1998 |

* cited by examiner

*Primary Examiner*—David L. Ometz
(74) *Attorney, Agent, or Firm*—Rader, Fishman & Grauer PLLC; Ronald P. Kananen

(57) ABSTRACT

A turntable for mounting an optical disk without occurrence of eccentricity including: a fixed portion (48) fitted in a centre hole of the optical disk; a movable portion (50) fitted in the center hole with the fixed portion (48) as a reference so as to be elastically deformed to correct eccentricity when the optical disk is mounted; a shaft portion (42) molded integrally with the fixed portion (48) and into which is inserted a drive shaft (14a) of a drive motor for rotating a turntable (12) continuously; and a plate spring (60) for returning, when the optical disk is not mounted, the movable portion (50) from a position when the optical disk is mounted to a position when not mounted. The plate spring (60) is secured to the shaft portion (42) directly.

2 Claims, 20 Drawing Sheets

REPLACEMENT SHEET

TURN TABLE AND OPTICAL DISK USING THE TURN TABLE

TECHNICAL FIELD

The present invention relates to a turntable for mounting a disk-like information recording medium thereon to rotate it continuously, and an optical disk using the turntable.

BACKGROUND ART

A turntable has been heretofore used in order to rotate and drive a disk-like recording medium, for example, an optical disk such as a compact disk (CD), or a Digital Versatile Disk (DVD).

As a turntable for mounting an optical disk thereon to rotate and drive it, the turntable constituted as shown in FIG. 1 is used. In the turntable 1000, an optical disk D is fitted in a centering portion 1002 formed with a centre hole 1001 in a centre portion of the turntable 1000 whereby the optical disk D is mounted on the turntable 1000. The centering portion 1002 is formed into a convergent trapezoid, and is formed, in the circumferential surface, with an elastic displacing element 1004 elastically displaced in a diametrical direction and a fixed element 1003 alternately there around. The inner peripheral surface of the centre hole 1001 is pressed and supported by the elastic displacing element 1004 and placed in contact with the fixed element 1003 to coincide the rotational centre with a rotational centre CL of the turntable 1000, and the optical disk D is mounted on the turntable 1000.

A magnet 1005 is provided on the centering portion 1002 of the turntable 1000. The magnet 1005 magnetically attracts a chucking portion not shown to hold the optical disk D in cooperation with the turntable 1000. A yoke 1006 is provided on the lower side of the magnet 1005. The centering portion 1002 is secured to the turntable 1000 by pressing, and the turntable 1000 is mounted on a drive shaft 1008 of a spindle motor 1007 by pressing. The elastic displacing element 1004 for carrying out the centering operation of the optical disk D provided and mounted on the centering portion 1002 is formed of a creepless material such as PEI (poly ether imido) which is hard to produce the creeping phenomenon in order to prevent the creeping phenomenon from occurring in the state that the optical disk D is mounted not to return to the original state.

The turntable 1000 heretofore used has the construction in which the centering portion 1002 is pressed into the centre portion and pressed into the drive shaft 1008 to mount it. That is, since the centering portion 1002 and the turntable 1000 are formed from a separate member, not only assembling is difficult but also mounting aimed at centering for allowing the centre of the centering portion 1000 to coincide with the centre of the drive shaft 1008 is difficult.

There is a further problem that since the a creepless material such as PEI (poly ether imido) is high in molding temperature, injection molding of the centering portion 1002 cannot be carried out in the state that the magnet 1005 is put into a molding mold. When the magnet 1005 is exposed to the high temperature atmosphere, demagnetization occurs, and therefore, the centering portion 1002 cannot be molded with the magnet 1005 inserted. Therefore, the magnet 1005 is fixed by adhesion after the centering portion 1002 has been molded. Since such a magnet 1005 is adhered, the assembling step of the centering portion 1002 becomes complex, leading to the higher cost, and further posing a problem also in reliability in term of assembly.

Further, when the optical disk is mounted on the turntable and rotated continuously, it is also necessary to prevent the optical disk from slipping with respect to the turntable. That is, the optical disk need be rotated and driven integral with the turntable.

DISCLOSURE OF THE INVENTION

It is an object of the present invention to provide a novel turntable and an optical disk device using the turntable, which solves the technical problem noted above with respect to the conventional turntable.

It is a further object of the present invention to provide a turntable and an optical disk device using the turntable in which when a disk-like information recording medium is mounted, correction of eccentricity of the information recording medium can be carried out positively by a simple constitution.

It is another object of the present invention to provide a turntable and an optical disk device using the turntable capable of mounting a disk-like information recording medium so as to be rotated and driven positively integrally while suppressing occurrence of eccentricity when the disk-like information recording medium is mounted.

In the turntable according to the present invention, a fixed portion is fitted into a centre hole of a disk-like information recording medium. A movable portion corrects eccentricity when the disk-like information recording medium is mounted. A return assisting member has a function in which when the disk-like information recording medium is not mounted, the movable portion is returned from a position when the disk-like information recording medium is mounted to a position when the disk-like information recording medium is not mounted. By the provision of this constitution, when the disk-like information recording medium is mounted, the movable portion is able to correct eccentricity of the disk-like information recording medium. Moreover, the return assisting member is able to return the movable portion from a position when the disk-like information recording medium is mounted to a position when the disk-like information recording medium is not mounted. From this, the movable portion is able to correct eccentricity positively when the disk-like information recording medium is mounted.

By the provision of the return assisting member, a portion including the movable portion need not to use quality of a creepless material for preventing the creeping phenomenon unlike prior art, but is able to use synthetic resin having been used widely heretofore as a material for constituting a turntable. From this, since a special quality like a creeping material is not used, the cost can be reduced. Moreover, since the return assisting member is secured to the shaft portion, a special portion is not necessary for securing the return assisting member, and the return assisting member can be secured to the shaft portion directly, for example, by pressing or adhesion. From this, the construction is simple, and the cost can be reduced.

In the turntable according to the present invention, the movable portion has elastic displaceable elements, a plurality of which are arranged at equal angles about a rotational centre shaft. Since the plurality of elastic displaceable elements are arranged at equal angles about a rotational centre shaft, it is possible to correct eccentricity of the disk-like information recording medium mounted on the centering portion positively at any position.

Further, the turntable according to the present invention has a member for chucking the disk-like information recording medium, and a magnet for attracting the chucking member magnetically, the disk-like information recording medium being held detachably between the magnet and the chucking member. The magnet provided on the turntable attracts the chucking member to hold the disk-like information recording medium detachably.

Further, a turntable for mounting a disk-like information recording medium to continuously rotate it according to the present invention comprises a fixed portion having a hole for fitting a shaft of a motor for continuously rotating the turntable and fitted in a centre hole of the disk-like information recording medium, a movable portion fitted in an inner peripheral edge with the fixed portion as s reference to be elastically deformed to correct eccentricity when the disk-like information recording medium is mounted, and a return assisting member in which when the disk-like information recording medium is not mounted, the movable portion is returned from a position when the disk-like information recording medium is mounted to a position when the disk-like information recording medium is not mounted.

In the turntable, the fixed portion is fitted in a centre hole of the disk-like information recording medium. The movable portion corrects eccentricity when the disk-like information recording medium is mounted. The return assisting member has a function for returning the movable portion from a position when the disk-like information recording medium is mounted to a position when the disk-like information recording medium is not mounted. With this, when the disk-like information recording medium is mounted on the turntable, the movable portion is able to correct eccentricity of the disk-like information recording medium. Moreover, the return assisting member is able to return the movable portion from a position when the disk-like information recording medium is mounted to a position when the disk-like information recording medium is not mounted. With this, the movable portion is able to correct eccentricity positively when the disk-like information recording medium is mounted.

By the provision of the return assisting member, a portion including the movable portion need not to use quality of a creepless material for preventing the creeping phenomenon unlike prior art, but is able to use synthetic resin having been used widely heretofore as a material for constituting a turntable. From this, since a special quality like a creeping material is not used, the cost can be reduced. Further, the fixed portion has a hole for fitting a drive shaft of a drive motor, and the return assisting member can be secured to the drive shaft of the drive motor directly. From this, since the return assisting member need not to prepare a special portion but may be secured to the drive shaft directly, the construction is simple, and the cost can be reduced.

The movable portion provided on the turntable comprises elastic displaceable elements, a plurality of which are arranged at equal angles about a rotational centre shaft. Since the plurality of elastic displaceable elements are arranged at equal angles about a rotational centre shaft, the movable portion is possible to correct eccentricity of the disk-like information recording medium positively at any position.

Also in this turntable, it has a member for chucking a disk-like information recording medium, and a magnet for attracting the member for chucking magnetically; and the disk-like information recording medium is held between the magnet and the member for chucking detachably. The magnet provided on the turntable attracts the chucking member to hold the disk-like information recording medium detachably.

Further, according to the present invention, there is provided an optical disk device having a turntable for mounting a disk-like information recording medium to rotate it continuously, the turntable provided on the device comprising: a fixed portion fitted in a centre hole of the disk-like information recording medium; a movable portion fitted in the centre hole with the fixed portion as a reference to be elastically deformed to correct eccentricity when the disk-like information recording medium is mounted; a shaft portion molded integral with the fixed portion and into which is inserted a drive shaft of a drive motor for rotating the turntable continuously; and a return assisting member for returning, when the disk-like information recording medium is not mounted, the movable portion from a position when the disk-like information recording medium is mounted to a position when the disk-like information recording medium is not mounted, the return assisting member being secured to the shaft portion directly.

The turntable used for the optical disk device is fitted in the centre hole of the disk-like information recording medium. The movable portion corrects eccentricity when the disk-like information recording medium is mounted. The return assisting member has a function for returning, when the disk-like information recording medium is not mounted, the movable portion from a position when the disk-like information recording medium is mounted to a position when the disk-like information recording medium is not mounted. By the provision of this constitution, when the disk-like information recording medium is mounted, the movable portion is able to correct eccentricity of disk-like information recording medium. Moreover, the return assisting member is able to return, when the disk-like information recording medium is not mounted, the movable portion from a position when the disk-like information recording medium is mounted to a position when the disk-like information recording medium is not mounted. From this, the movable portion is able to correct eccentricity positively when the disk-like information recording medium is mounted.

By the provision of the return assisting member, a portion including the movable portion need not to use quality of a creepless material for preventing the creeping phenomenon unlike prior art, but is able to use synthetic resin having been used widely heretofore as a material for constituting a turntable. From this, since a special quality like a creeping material is not used, the cost can be reduced. Further, since the return assisting member is secured to the shaft portion, a special portion for securing the return assisting member is not necessary, but can be secured to the drive shaft directly, for example, by pressing or adhesion. From this, the construction is simple, and the cost can be reduced.

In the turntable used for the optical disk device according to the present invention, the movable portion comprises elastic displaceable elements, a plurality of which are arranged at equal angles about a rotational centre shaft. Since the plurality of elastic displaceable elements are arranged at equal angles about a rotational centre shaft, the movable portion is possible to correct eccentricity of the disk-like information recording medium mounted on the centering portion positively at any position.

Further, the turntable has a member for chucking a disk-like information recording medium, and a magnet for attracting the member for chucking magnetically; and the disk-like information recording medium is held detachably between the magnet and the member for chucking. The magnet provided on the turntable attracts the chucking member to hold the disk-like information recording medium detachably.

Further, according to the present invention, there is provided an optical disk device provided with a turntable for mounting a disk-like information recording medium to rotate it continuously, comprising: a fixed portion having a hole for fitting a shaft of a motor for rotating the turntable continuously and fitted in a centre hole of the disk-like information recording medium; a movable portion fitted in the centre hole with the fixed portion as a reference to be elastically deformed to correct eccentricity when the disk-like information recording medium is mounted; and a return assisting member for returning, when the disk-like information recording medium is not mounted, the movable portion from a position when the disk-like information recording medium is mounted to a position when the disk-like information recording medium is not mounted. A centering portion constituting the fixed portion of the turn table is provided with a hole for fitting a drive shaft of a drive motor for rotating the turntable continuously, and the return assisting member is secured to the drive shaft of the drive motor directly.

In the optical disk device, the fixed portion of the turntable is fitted in the centre hole of the disk-like information recording medium. The movable portion corrects eccentricity when the disk-like information recording medium is mounted. The return assisting member has a function for returning, when the disk-like information recording medium is not mounted, the movable portion from a position when the disk-like information recording medium is mounted to a position when the disk-like information recording medium is not mounted. Thereby, when the disk-like information recording medium is mounted on the turntable, the movable portion is able to correct eccentricity of the disk-like information recording medium. Moreover the return assisting member is able to return the movable portion from a position when the disk-like information recording medium is mounted to a position when the disk-like information recording medium is not mounted. From this, the movable portion is able to correct eccentricity positively when the disk-like information recording medium is mounted.

By the provision of the return assisting member, a portion including the movable portion need not to use quality of a creepless material for preventing the creeping phenomenon unlike prior art, but is able to use synthetic resin having been used widely heretofore as a material for constituting a turntable. From this, since a special quality like a creeping material is not used, the cost can be reduced. Further, the fixed portion has a hole for fitting the drive shaft of the drive motor, and the return assisting member can be secured to the drive shaft of the drive motor directly. Thereby, since the return assisting member need not prepare a special portion, but may be secured to the drive shaft directly, the construction is simple and the cost can be reduced.

The movable portion provided on the turntable comprises elastic displaceable elements, a plurality of which are arranged at equal angles about a rotational centre shaft. Since the plurality of movable portions are arranged at equal angles about a rotational centre shaft, the movable portion is possible to correct eccentricity of the disk-like information recording medium positively at any position.

Also the turntable further has a member for chucking a disk-like information recording medium, and a magnet for attracting the member for chucking magnetically; and the disk-like information recording medium is held detachably between the magnet and the member for chucking. The magnet provided on the turntable attracts the chucking member to hold the disk-like information recording medium detachably.

Further, according to the present invention, there is provided a turntable for mounting a disk-like information recording medium to rotate it continuously, comprising: a fixed portion fitted in a centre hole of a disk-like information recording medium; a movable portion fitted in the centre hole with the fixed portion as a reference to be elastically deformed to correct eccentricity when the disk-like information recording medium is mounted; a return assisting member for returning, when the disk-like information recording medium is not mounted, the movable portion from a position when the disk-like information recording medium is mounted to a position when the disk-like information recording medium is not mounted; and a slip preventive portion provided on the return assisting member to come in contact with the disk-like information recording medium mounted to thereby prevent the disk-like information recording medium from slipping.

The fixed portion provided on the turntable is fitted in the centre hole of the disk-like information recording medium. The movable portion corrects eccentricity when the disk-like information recording medium is mounted. The return assisting member has a function for returning, when the disk-like information recording medium is not mounted, the movable portion from a position when the disk-like information recording medium is mounted to a position when the disk-like information recording medium is not mounted. The slip preventive portion prevents, with which the disk-like information recording medium mounted comes in contact, the disk-like information recording medium from slipping. By the provision of such a constitution as described, the movable portion is able to correct eccentricity of the disk-like information recording medium when the disk-like information recording medium is mounted on the turntable. Moreover, the return assisting member is able to return, when the disk-like information recording medium is not mounted, the movable portion from a position when the disk-like information recording medium is mounted to a position when the disk-like information recording medium is not mounted. From this, the movable portion is able to correct eccentricity positively when the disk-like information recording medium is mounted.

The turntable according to the present invention is provided with the slip preventive portion to thereby enable positive integration of the disk-like information recording medium mounted without slipping to rotate and drive it.

Furthermore, according to the present invention, there is provided an optical disk device having a turntable for mounting a disk-like information recording medium to rotate it continuously, the turntable used in the device comprising: a fixed portion fitted in a centre hole of the disk-like information recording medium; a movable portion fitted in the centre hole with the fixed portion as a reference to be elastically deformed to correct eccentricity when the disk-like information recording medium is mounted; a return assisting member for returning, when the disk-like information recording medium is not mounted, the movable portion from a position when the disk-like information recording medium is mounted to a position when the disk-like information recording medium is not mounted; and a slip preventive portion provided on the return assisting member to prevent, with which the disk-like information recording medium mounted comes in contact, the disk-like information recording medium from slipping.

The fixed portion provided on the turntable is fitted in the centre hole of the disk-like information recording medium. The movable portion corrects eccentricity when the disk-like information recording medium is mounted. The return assisting member has a function for returning, when the disk-like information recording medium is not mounted, the movable portion from a position when the disk-like information recording medium is mounted to a position when the disk-like information recording medium is not mounted. The slip preventive portion prevents, with which the disk-like information recording medium mounted comes in contact, the disk-like information recording medium from slipping. By the provision of such a constitution as described, the movable portion is able to correct eccentricity of the disk-like information recording medium when the disk-like information recording medium is mounted on the turntable. Moreover, the return assisting member is able to return, when the disk-like information recording medium is not mounted, the movable portion from a position when the disk-like information recording medium is mounted to a position when the disk-like information recording medium is not mounted. From this, the movable portion is able to correct eccentricity positively when the disk-like information recording medium is mounted, and by the provision of the slip preventive portion, the disk-like information recording medium mounted can be placed in positive integration without slipping to rotate and drive it.

Further other objects of the present invention and the specific advantages obtained by the present invention will be more apparent from the ensuing explanation of the embodiments.

BEST MODE FOR CARRYING OUT THE INVENTION

The turntable and the optical disk device using the turntable according to the present invention will be explained hereinafter referring to some embodiments.

It is noted that since the embodiments shown below are preferred embodiments of the present invention, technically preferred limitations are noted. However, the present invention is not limited to these embodiments unless there is a statement that particularly limits the present invention in the ensuing explanation.

Figure 1:
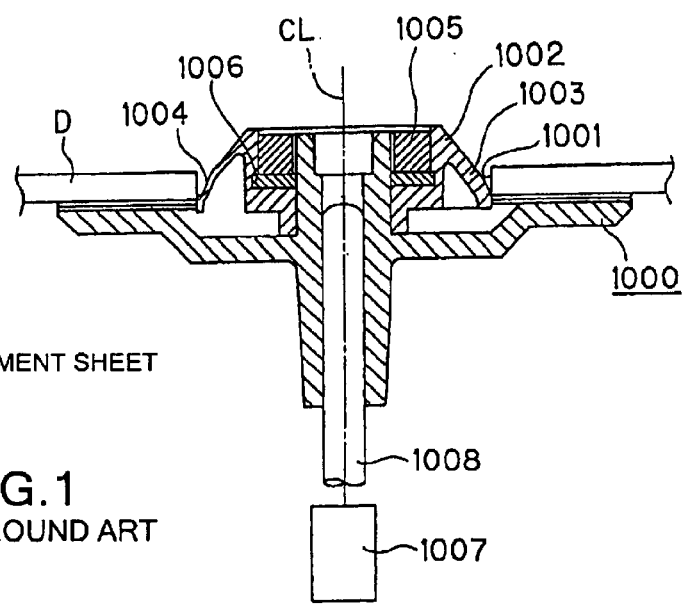
FIG. 1 is a sectional view of a conventional turntable.
Figure 2:
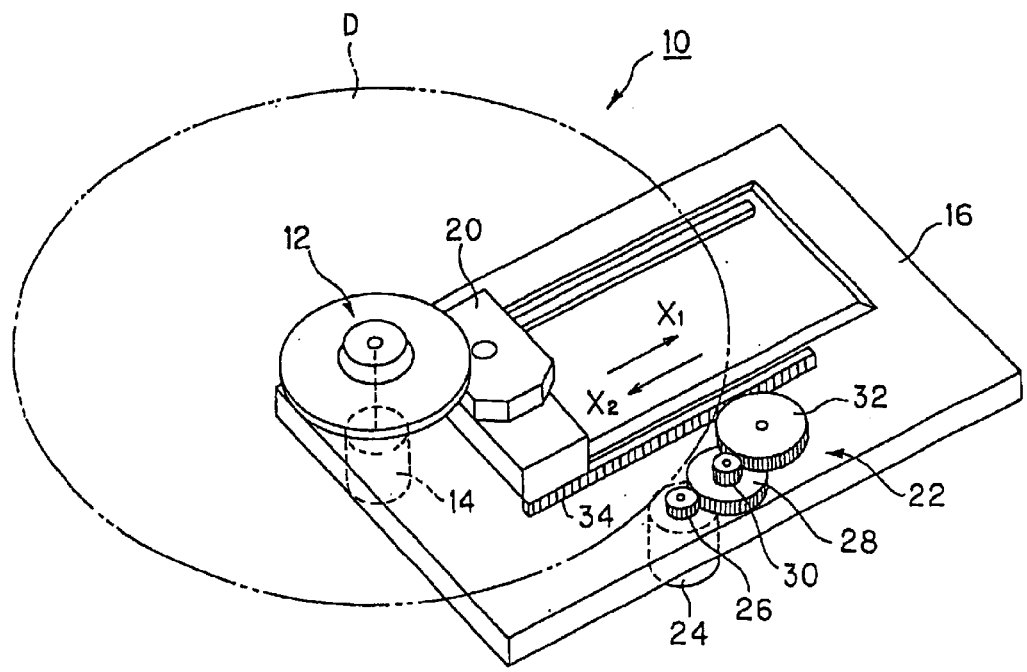
FIG. 2 is a perspective view showing an optical disk device having a turntable according to the present invention.

First, an optical disk device using a turntable 1 according to the present invention will be explained. In this optical disk device, a turntable 12, on which is detachably mounted an optical disk D such as a compact disk or DVD which is a disk-like information recording medium, is provided on one end of a base member 16, as shown in FIG. 2. The turntable 12 is mounted on a drive motor 14 mounted on the base member 16, and is rotated and driven by the drive motor 14.

In FIG. 2, a casing of the optical disk device 10 is not shown, but the base member 16 is encased in the casing. The base member 16 is provided with a pick up feed mechanism 22 which supports an optical pick-up 20 to feed/operate it in a direction of arrow X1 or in a direction of arrow X2 in FIG. 2. The pick up feed mechanism 22 is provided with a drive motor 24 for feed-operating the optical pick up 20. The driving force of the drive motor 24 is transmitted to a rack 34 through a plurality of gears 26, 28, 30 and 32, and the rack 34, and the rack 34 is move/operated to thereby feed/operate the optical pick up 20 in a direction of arrow X1 or in a direction of arrow X2 in FIG. 2.

The optical pick up 20 has a function that for example, a laser beam is irradiated on the read surface of the optical disk D mounted on the turntable 12 to optically read information recorded in the optical disk D, or information is written in the optical disk D by a laser beam as necessary. The optical pick up 20 may be exclusive use for read only that only reads information of the optical disk D as mentioned above, or may be of a recording and reproducing type capable of reading information or writing information in the optical disk D.

The turntable 12 according to the present invention used in the aforementioned optical disk device will now be described in detail with reference to FIGS. 3 and 4.

Figure 3:
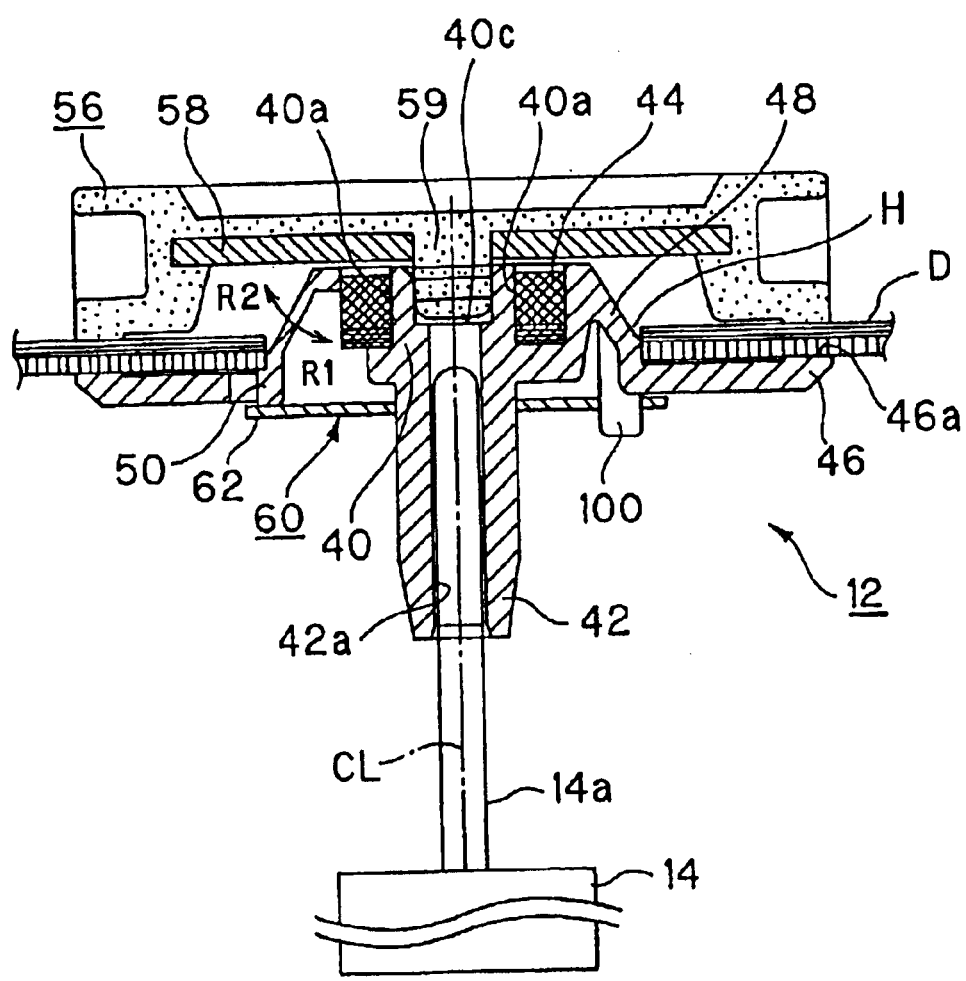
FIG. 3 is a sectional view showing a turntable and a motor of the optical disk device shown in FIG. 2.
Figure 4:
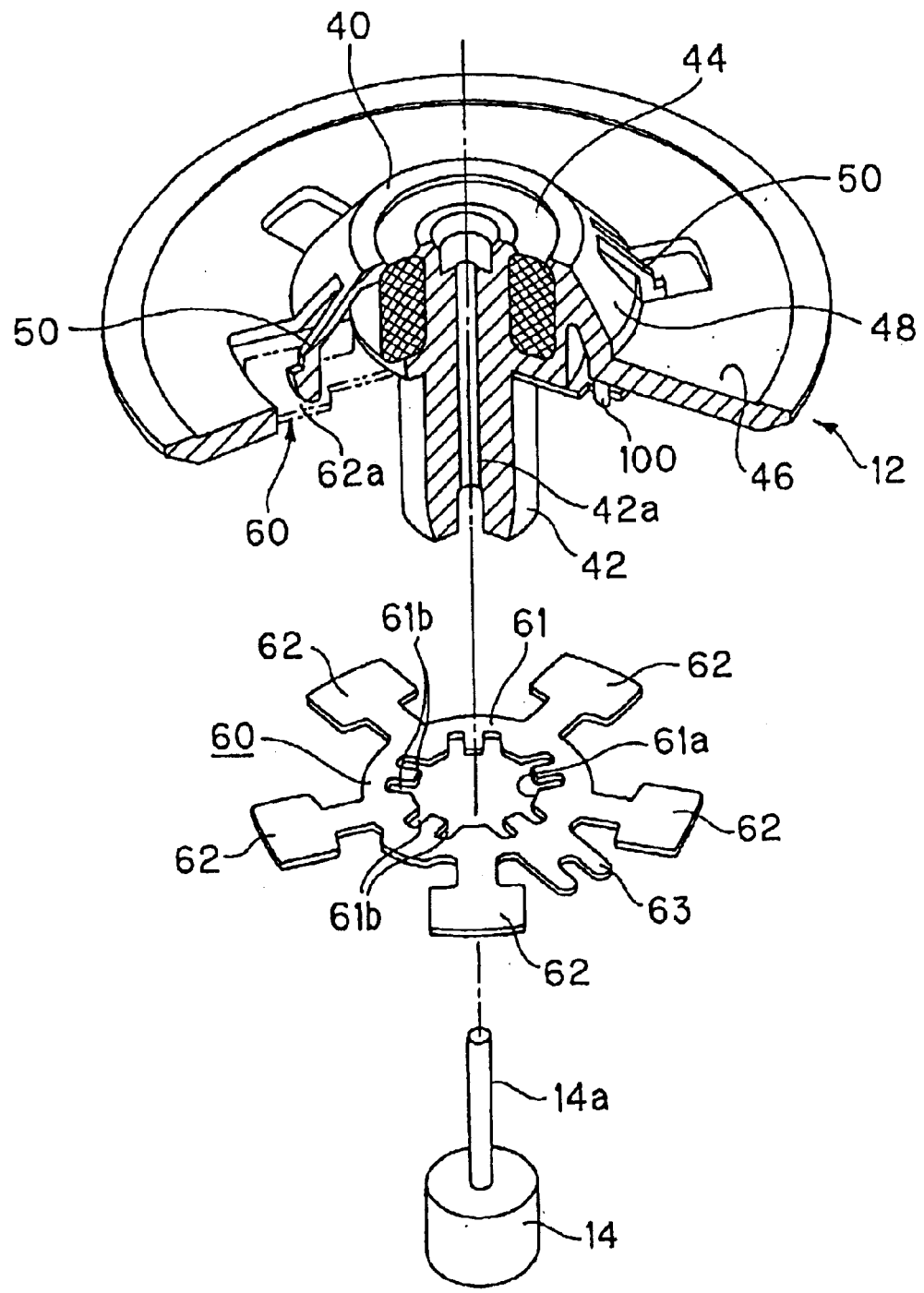
FIG. 4 is an exploded perspective view showing a turntable, a plate spring and a motor of the optical disk device shown in FIG. 2.

The turntable 12 according to the present invention has a centering portion 40 and a shaft portion 42, as shown in FIGS. 3 and 4, the centering portion 40 and the shaft portion 42 being formed integrally. The centering portion 40 and the shaft portion 42 can be formed using synthetic resin, for example, such as polycarbonate. As material constituting the centering portion 40 and the shaft portion 42, any material having quality not to demagnetize the magnetic force of a magnet 44 may be used.

The turntable 12 has a centering portion 40, a receiving portion 46, a fixed portion 48, and a plurality of movable portions 50. The receiving portion 46, the fixed portion 48, and the movable portions 50 are formed by integral molding. The centering portion 40 is integral with the shaft portion 2 as described above, but the shaft portion 42 is formed to be projected in an axial direction. The shaft portion 42 is formed in its centre with a shaft insert hole 42a along the centre shaft CL, and a drive shaft 14a of the drive motor 14 is pressed into the shaft insert hole 42a.

The magnet 44 is mounted integral with the centering portion 40. The magnet 44 is mounted so as to be buried into a concave portion 40a formed ringwise on the outer peripheral side on the extreme end side of the centering portion 40. That is, the magnet 44 is mounted by subjecting to insert molding with respect to the centering portion 40. The magnet 44 can be subjected to insert molding with respect to the centering portion 40 because the centering portion 40 and the shaft portion 42 are formed of synthetic resin normally used without using special synthetic resin material which is a conventional creepless material. Moreover, since the centering portion 40 and the shaft portion 42 are formed of a material not to demagnetize the magnetic force of the magnet 44, the magnet 44 is able to sufficiently hold its own magnetic force.

A chucking portion 56 for holding the optical disk D together with the turntable 12 is provided with a metal plate 58. The magnet 44 magnetically attracts the metal plate 58 of the chucking portion 56 and a boss of the chucking portion 56 is fitted in an engaging concave portion 40c provided in the centre portion on the upper end side of the centering portion 40 whereby the chucking portion 56 presses the optical disk D against the receiving portion 46 of the turntable 12 for chucking.

Figure 5:
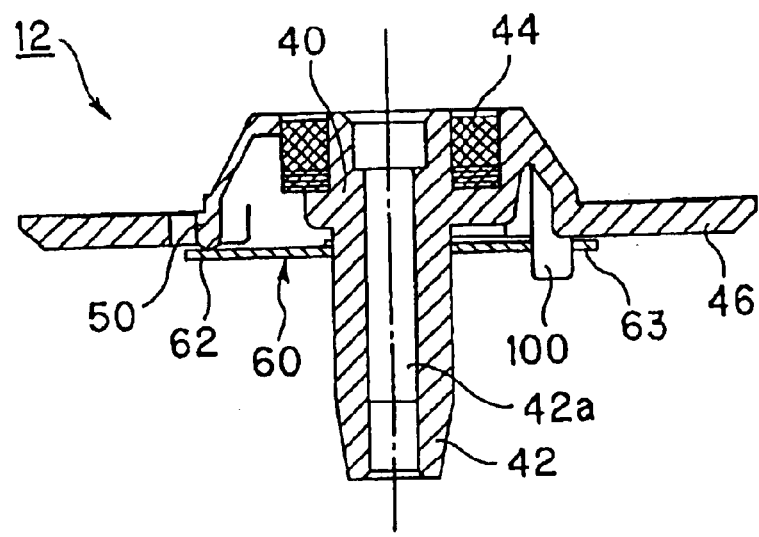
FIG. 5 is a sectional view showing the turntable and the plate spring shown in FIG. 4.
Figure 6:
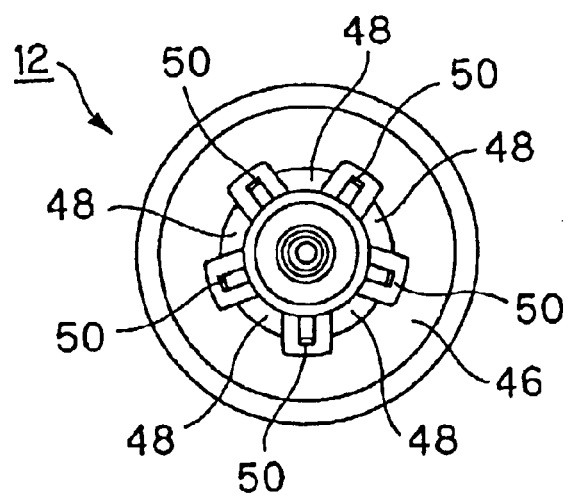
FIG. 6 is a plan view showing the turntable shown in FIG. 5.

The centering portion 40 formed into a convergent trapezoid is formed with the fixed portion 48 as shown in FIGS. 4, 5 and 6. The fixed portion 48 is constituted by a part of a tapered outer peripheral portion of the centering portion 40. Further, for example, five movable portions 50 are formed at equal intervals in a peripheral direction on the outer peripheral portion of the centering portion 40.

The fixed portion 48 is a portion for supporting an inner peripheral edge 46 of a centre hole H of the optical disk D, as shown in FIG. 3, and a plurality of movable portions 50 has a centering function that they are formed to be elastically displaceable, or elastically movable, elements long-cantilever supported along the outer peripheral surface of the centering portion 40 to be elastically displaced to coincide the rotational centre of the optical disk D with the centre shaft CL of the turntable 12.

Further, on the lower end side of the centering portion 40 is provided a plate spring 60 as a return assisting member for returning the elastically deformed movable portion 50 to an initial position, as shown in FIG. 3. The plate spring 60 is formed, for example, from a thin metal sheet, and has a function that in the state that the optical disk D is mounted on the movable portion 50, the plate spring 60 is elastically deformed in a direction of arrow R1 in FIG. 3 together with the movable portion 50, and when the optical disk D is removed from the turntable 12, the movable portion 50 is forcibly returned in a direction of arrow R2 in FIG. 3 so as to assume the initial state when the optical disk D is mounted shown in FIG. 5.

Figure 7:
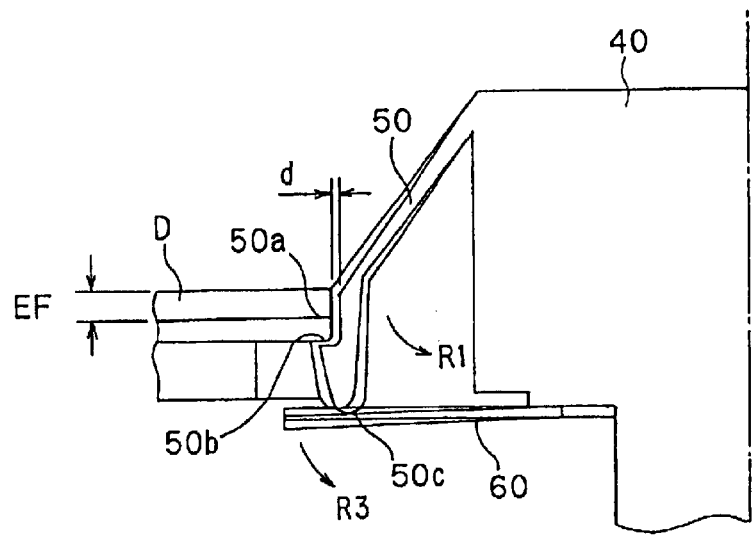
FIG. 7 is a view showing that the plate spring be the assisting force at the time of centering.

Incidentally, the movable portion 50 formed integral with the centering portion 40 by mold molding of synthetic resin is provided, on the free end side, with a vertical portion 50a larger than a thickness portion EF of the optical disk D, as shown in FIG. 7. On the extreme end side of the vertical portion 50a is formed a stopping shoulder portion 50b for stopping the optical disk D inserted into the centering portion 40. The outer peripheral diameter of a portion of the vertical portion 50a of a plurality of movable portions 50 provided in the centering portion 40 is formed to be larger than the inner peripheral diameter of the center hall H to be a reference of the optical disk D. That is, the movable portion 50 is formed so that when the centering portion 40 comes in engagement with the centre hole H of the optical disk D, the movable portion 50 may be elastically deformed by a fixed amount by the inner peripheral edge of the centre hole H, for example, in a direction of arrow R1 in FIG. 7 on the inner peripheral side shown by an arrow d in FIG. 7.

When the movable portion 50 is elastically deformed in a direction of R1 in FIG. 7 by the optical disk D, the plate spring 60 functioned as a return assisting member is pressed by a free end 50c of the movable portion 50 and elastically deformed in a direction of arrow R3 in FIG. 7 in the same direction as the elastically deforming direction of the movable portion 50. The plate spring 60 imparts the elastic force for returning the movable portion 50 to the initial position when the optical disk D is mounted on the turntable 12 with the centre hole H inserted into the centering portion 40.

When the optical disk D is pressed and elastically deformed by the movable portion 50 formed by the molded body of synthetic resin, and removed from the centering portion 40, the plate spring 60 for elastically returning the movable portion to the initial position is formed of metal, and therefore, is excellent in temperature characteristic as compared with the movable portion 50 made of synthetic resin and is able to maintain the stabilized elastic force without being greatly affected by the change of temperature of the external environment. The movable portion 50 is elastically displaced making use of the elastic force of the late spring 60 to thereby enable elastic displacement in the stabilized state so that the optical disk D is mounted positively on the centering portion 40 to enable accurate centering to realized mounting to the turntable 12.

By the provision of the plate spring 60 for assisting the elastic displacement of the movable portion 50 for carrying out centering provided integral with the centering portion made of synthetic resin, it is possible to prevent that the optical disk D is mounted on the turntable 12 as shown in FIG. 3, and when the state that the movable portion 50 is elastically displaced in a direction of arrow R1 in FIG. 3 is maintained for a long period of time, the creeping phenomenon occurs to fail to return to the initial position as shown in FIG. 5.

When assuming the state that the movable portion 50 cannot be elastically returned to the initial position, it is not possible to attain centering of the of the optical disk D by the centering portion 40.

In the present invention, after the movable portion 50 formed of synthetic resin has been elastically deformed and when the optical disk D is removed from the turntable 12 and thereby elastically returned in the direction of arrow R2 in FIG. 3, the movable portion 50 is pressed and biased by the elastic forces of the plate spring 60 in the elastically displaced state, and therefore, the stabilized elastic returning becomes enabled. By the provision of the plate spring 60 as described, for the centering portion 40 including the movable portion 50, a conventional expensive synthetic resin material having a creepless function is not used but a synthetic resin material heretofore used, for example, a polycarbonate resin or the like can be used, to enable reduction in cost for manufacturing the turntable 20.

As described above, the centering portion 40 is molded of synthetic resin such as polycarbonate resin whereby the magnet 44 provided on the centering portion 40 can be mounted integral with the centering portion 40 simultaneously with molding of the centering portion 40 when the centering portion 40 is molded. In this case, preferably, a synthetic resin material not to demagnetize the magnetic force of the magnet 44 is used for the centering portion 40.

The plate spring 60 constituting the turntable 12 according to the present invention is formed by punching a metal plate in the form of a thin sheet, for example, such as stainless steel for a spring (SUS 301-CSP, SUS 304-CSP) or bronze for a spring (C5210P-1/2H) as shown in FIG. 4. That is, the plate spring 60 is formed by punching a disk-like thin sheet metal plate by way of pressing or the like, a plurality of, for example, five support elements 62 are projected at equal intervals in a peripheral direction on the outer peripheral side of a ring-like portion 61 bored with a centre hole 61a, and a single detent element 63 is projected. The plate spring 60 is mounted on the bottom surface of the centering portion 40 by fitting the centre hole 61a in the shaft portion 42 of the turntable 12.

Figure 9:
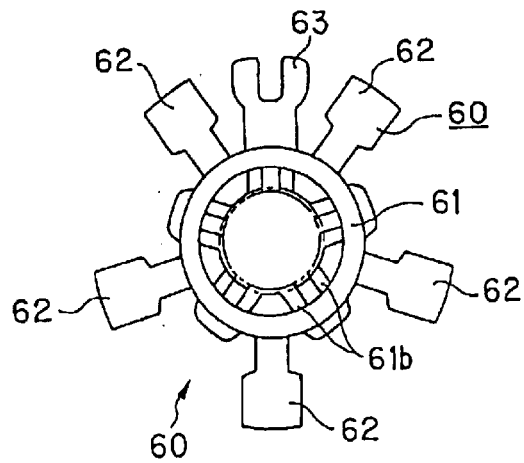
FIG. 9 is a plan view of the plate spring shown in FIG. 4.

It is noted that the ring-like portion 61 is formed in the inner peripheral surface thereof bored with a plurality of grooves 61b, as shown in FIGS. 4 and 9. As described above, by the provision of the grooves 61b, when the ring-like portion 61 is fitted in the shaft portion 42, the element between the grooves 61b is elastically displaced to thereby enable firm mounting of the plate spring 60 on the shaft portion 42.

In the outer periphery of the ring-like portion 61 of the plate spring 60, for example, five support elements 62 are formed so as to be projected in a diametrical direction, as mentioned above. Each support element 62 has a function of elastically deformably supporting the lower end of the movable portion 50 at a corresponding position. The support elements 62 are formed to be projected, preferably, at equal angle intervals with respect to the ring-like portion 61. Each support element 61 is formed substantially in the shape of T as shown in FIG. 9. Further, the single detent element 63 is formed between the support elements 62, 62 adjacent to each other. The detent element 63 has a function that it is engaged with an engaging projection 100 projected on the lower end of the fixed portion 48 to attain detention of the plate spring 60 with respect to the shaft portion 42 and to carry out axial locating of the plate spring 60 and the shaft portion 41. FIG. 5 shows the state that the detent 63 is fitted in the engaging projection 100. In the state that the detent 63 is fitted in the engaging projection 100 as described, the plate spring 60 supports the lower end of the movable portion 50. It is noted that the engaging projection 100 attains anti-slipping of the detent element 63 by melting and deforming the extreme end thereof as necessary.

Mounting of the plate spring 60 formed as described above on the shaft portion 42 is done by pressing the ring-like portion 61 into the shaft portion 42 through the centre hole 61a, as shown in FIG. 4. Further, for attaining the anti-slipping of the plate spring 60 from the shaft portion 42, the ring-like portion 61 may be bonded to the shaft portion 42 by an adhesive.

Figure 8:
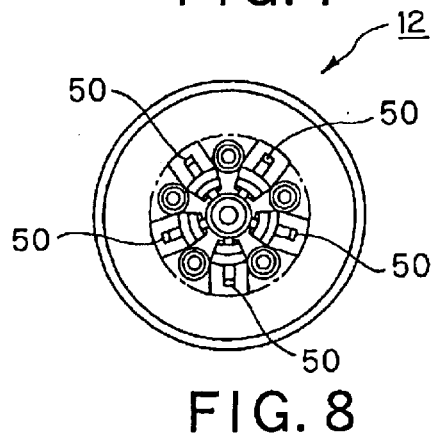
FIG. 8 is a bottom view of the turntable shown in FIG. 5.

FIG. 6 is a plan view of the turntable 12 according to the present invention, and FIG. 8 is a bottom view thereof. FIG. 6 shows five movable portions 50, fixed portions 48 and receiving portions 46 formed integral with the centering portion 40, and FIG. 8 shows five movable portions 50.

A further embodiment of the turntable according to the present invention will be explained with reference to FIGS. 10 to 12.

In the turntable 12, a plate spring is mounted on the shaft portion 42 by pressing the plate spring into the shaft portion 42 or by pressing and adhesion with respect to the shaft portion 42. In a plate spring 160 used herein, a plurality of support elements 62 are projected on the outer peripheral portion of the ring-like portion 61, as shown in FIG. 11. The support element 62 is formed substantially in the shape of T, and five support elements are provided at equal intervals around the outer peripheral portion of the ring-like portion 61.

Figure 10:
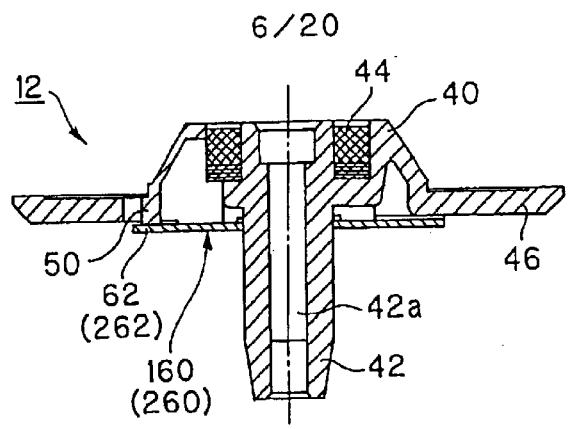
FIG. 10 is a sectional view showing another example of the turntable according to the present invention.
Figure 11:
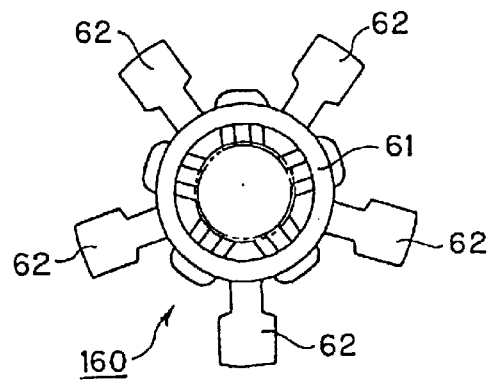
FIG. 11 is a plan view of the plate spring used for the turntable shown in FIG. 10.

The thus formed plate spring 160 is mounted on the turntable 12 by pressing the ring-like portion 61 into the shaft portion 42 or by pressing or adhesion with respect to the shaft portion 42, as shown in FIG. 10, and the free end of the movable portion 50 provided on the centering portion 40 is supported by the support element 62.

Figure 12:
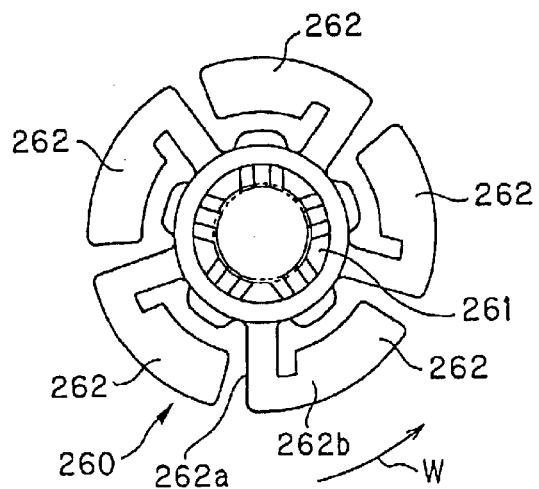
FIG. 12 is a plan view showing another example of the plate spring used in the turntable shown in FIG. 10.

Further, a plate spring 260 may be one formed as shown in FIG. 12. In the plate spring 260 shown in FIG. 12, five support elements 262 are formed at equal intervals around the outer peripheral portion of a ring-like portion 261. These support elements 262 are formed substantially in the shape of T, and have a connecting portion 262a projected in a radial direction and an arched portion 262b projected around the ring-like portion 61. The plate spring 260 is also mounted on the turntable 12 by pressing the ring-like portion 261 into the shaft portion 42 or by pressing or adhesion with respect to the shaft portion 42, as shown in FIG. 10, and the free end of the movable portion 50 provided on the centering portion 40 is supported by the support element 262. The plate spring 260 formed as shown in FIG. 12 is able to vary a contact position of the movable portion 50 with respect to the arched portion 262b to a position around the direction indicated by an arrow W in FIG. 12 by varying a mounting position around the shaft portion 42. The contact position of the movable portion 50 with respect to the arched portion 262b can be varied to thereby vary the support force for supporting the movable portion 50 of the arched portion 262b.

Figure 13:
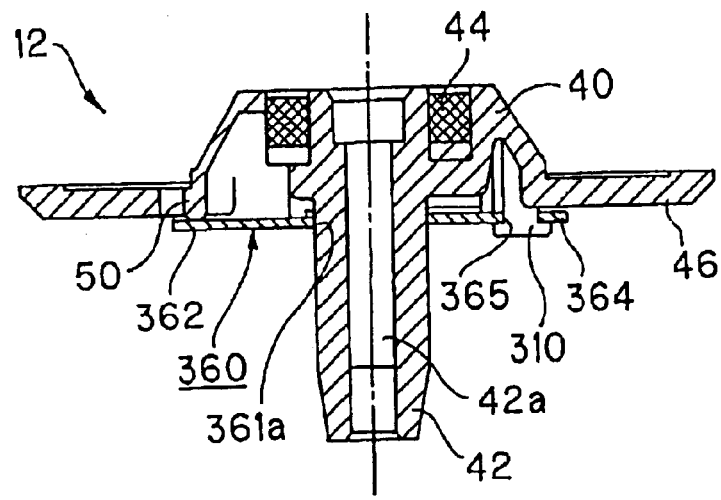
FIG. 13 is a sectional view showing a further example of the turntable according to the present invention.
Figure 14:
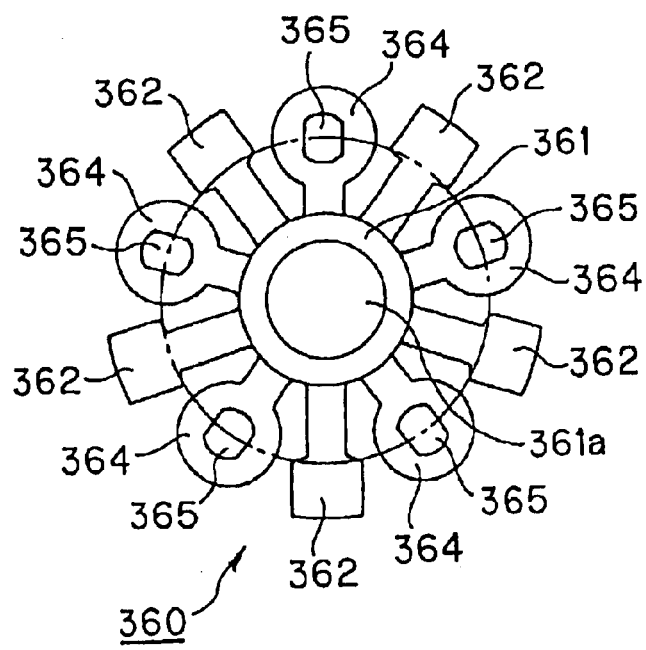
FIG. 14 is a plan view of the plate spring used in the turntable shown in FIG. 13.

Still another embodiment of the turntable 12 according to the present invention will be explained with reference to FIGS. 13 to 14.

In this turntable 12, a part of a plate spring 360 is brought into engagement with an engaging projection 310 projected on the bottom side of the centering portion 40 so as to mount the plate spring 360 on the turntable 12. In the plate spring360 used herein, five support elements 362 are projected at equal intervals around the outer peripheral portion of a ring-like portion 361. An engaging element 364 bored with an engaging hole 365 engaged with the engaging projection 310 at the extreme end is formed to be projected between the support elements 362, 362 adjacent to each other. The plate spring 360 is mounted on the turntable 12 by fitting the ring-like portion 361 in the shaft portion 42, and engaging an engaging hole 365 provided in the engaging projection 364 with the engaging projection 310. At this time, the extreme end of the engaging projection 310 is molten and deformed to enable attaining anti-slipping of the plate spring 360 from the shaft portion 42.

Another embodiment of the turntable 12 according to the present invention will be explained with reference to FIGS. 15 to 19.

Figure 15:
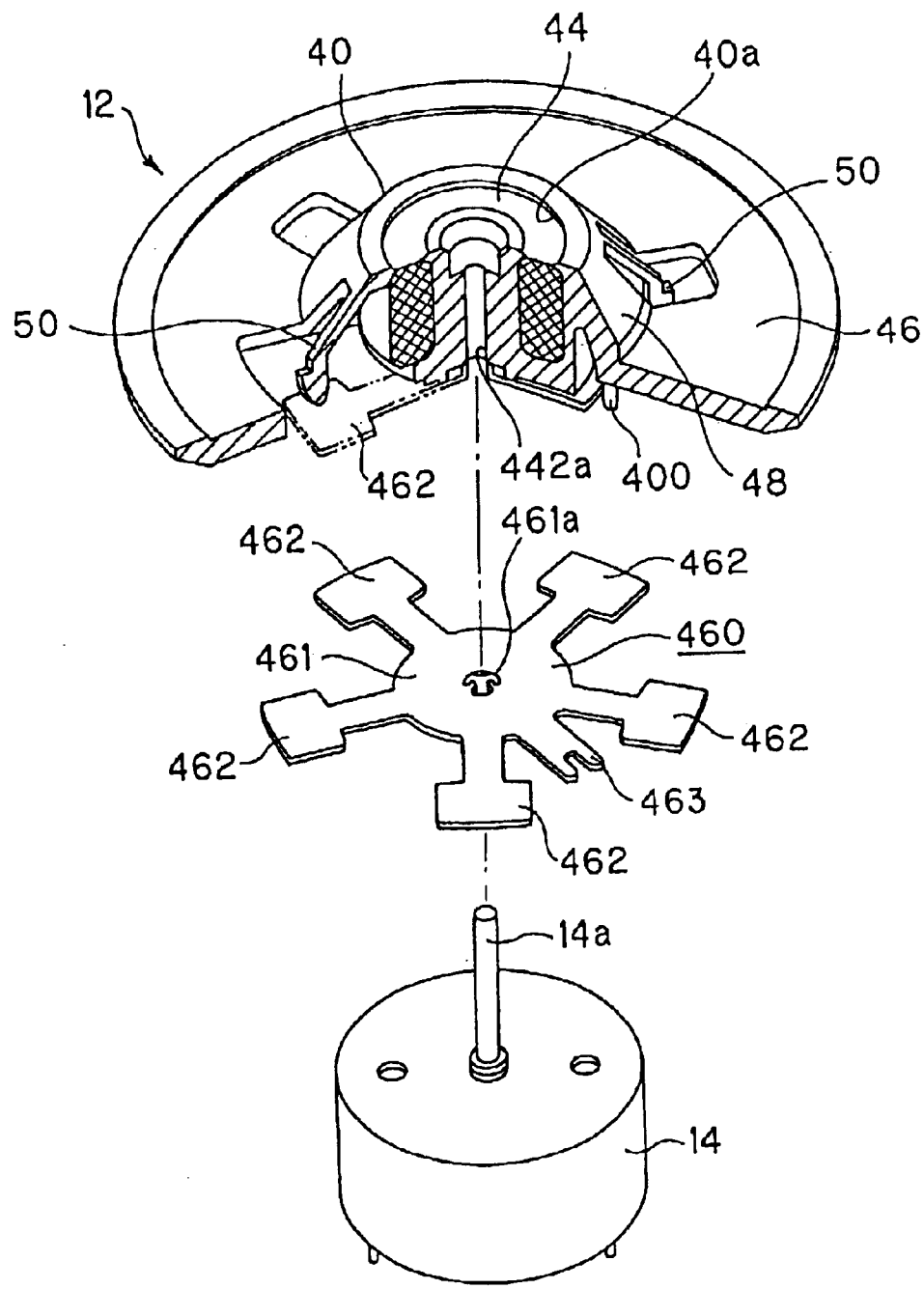
FIG. 15 is an exploded perspective view showing still another example of the turntable according to the present invention.
Figure 16:
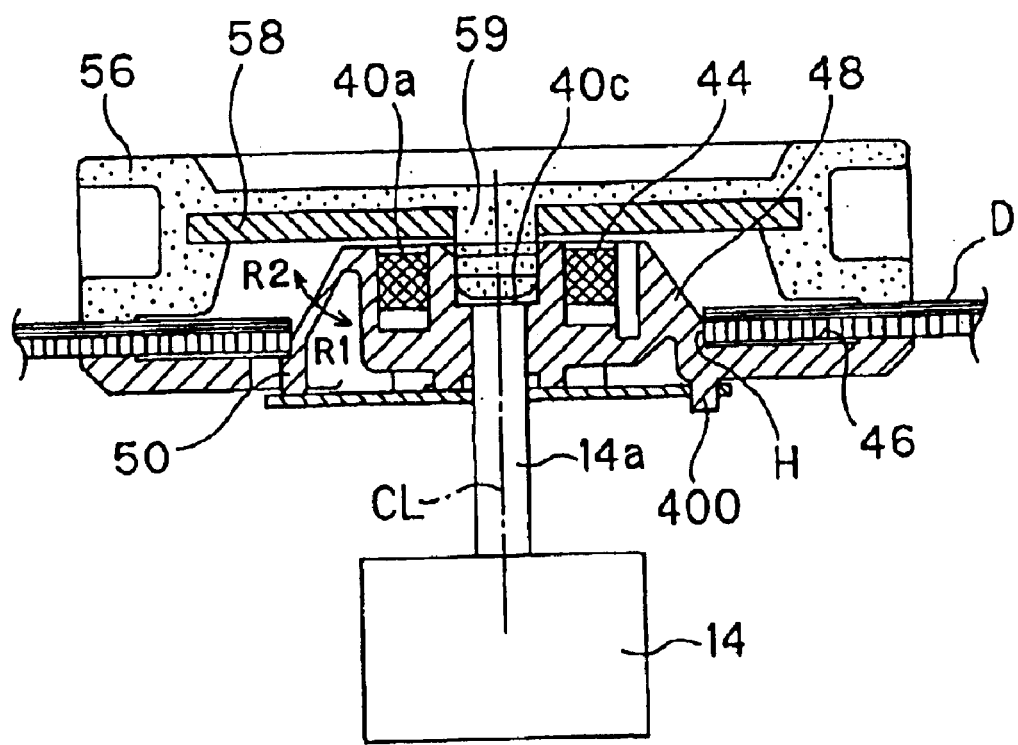
FIG. 16 is a sectional view thereof.
Figure 17:
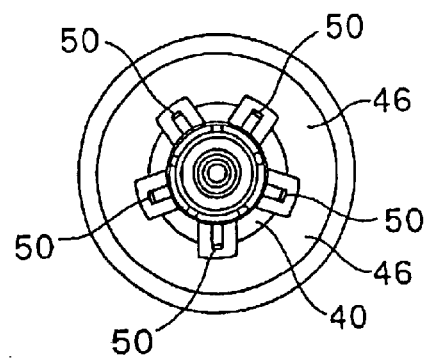
FIG. 17 is a plan view thereof.
Figure 18:
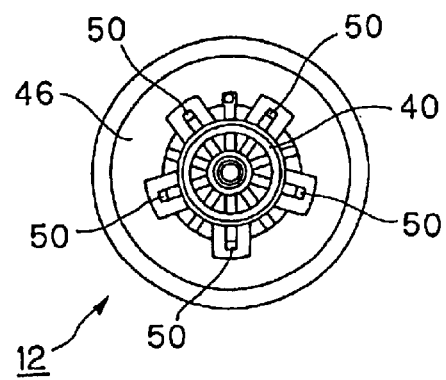
FIG. 18 is a bottom view thereof.
Figure 19:
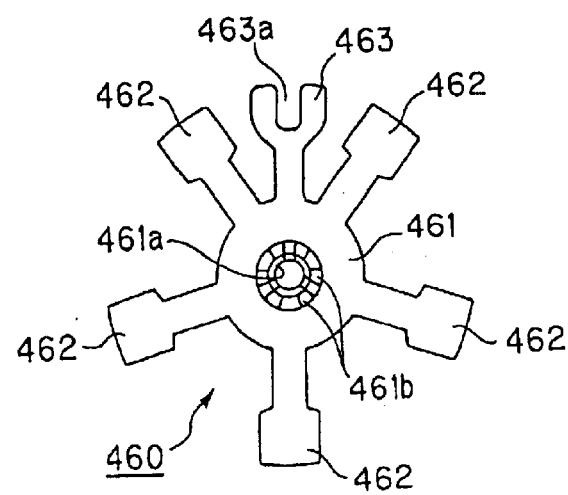
FIG. 19 is a plan view showing the plate spring used in the turntable shown in FIG. 15.

FIG. 15 is an exploded perspective view showing a turntable 12 and a motor 14 for rotating and driving the turntable 12; FIG. 16 is a sectional view showing the state that the turntable 12 is mounted on a drive shaft 14a of the motor 14; FIG. 17 is a plan view showing the turntable 12; FIG. 18 is a bottom view of the turntable 12; and FIG. 19 is a plan view showing a plate spring 19 used here.

The turntable 12 is formed, in its centre portion, with a centering portion 40 so as to be projected upward, as shown in FIGS. 15 and 16, similarly to that shown in the aforementioned embodiment. The centering portion 40 can be formed using synthetic resin, for example, such as polycarbonate, and as a material constituting the centering portion 40, any material may be used as long as it has quality not to demagnetize the magnetic force of the magnet 44.

The turntable 12 has a centering portion 40, a receiving portion 46, a fixed portion 48, and a plurality of movable portions 50. These receiving portion 46, fixed portion 48 and movable portions 50 are formed by integral molding. The centering portion 40 is provided with a shaft insert hole 442a in which the drive shaft 14a of the drive motor 14 is pressed into the centre portion. The turntable 12 is mounted so as to be rotated integral with the drive shaft 14a of the drive motor 14 through the shaft insert hole 442a.

The magnet 44 is mounted integrally in the centering portion 40 of the turntable 12. The magnet 44 is mounted so as to be buried in a concave portion 40a formed ringwise on the outer peripheral side on the extreme end side of the centering portion 40. That is, the magnet 44 is mounted by being insert-molded with respect to the centering portion 40. The magnet 44 can be insert-molded with respect to the centering portion 40 because the centering portion 40 and the shaft portion 42 are formed of synthetic resin used normally without using a special synthetic material which is a conventional creepless material. Moreover, since the centering portion 40 and the shaft portion 42 are formed of a material not to demagnetize the magnetic force of the magnet 44, the magnet 44 is able to sufficiently hold its own magnetic force.

A metal plate 58 is provided on a chucking portion 56 for holding the optical disk D together with the turntable 12. The magnet 44 magnetically attracts the metal plate 58 of the chucking portion 56, and a boss 59 of the chucking portion 56 is fitted into an engaging concave portion 49c provided in the centre portion on the upper end side of the centering portion 40 whereby the chucking portion 56 presses the optical disk D against the receiving portion 46 of the turntable 12 for chucking.

The centering portion 40 formed into a convergent trapezoid is formed with a fixed portion 48 as shown in FIGS. 15 and 16. The fixed portion 48 is constituted by a part of a tapered outer peripheral portion of the centering portion 40. Further, for example, five movable portions 50 are formed at equal intervals around the outer peripheral portion of the centering portion 40.

The fixed portion 48 is a portion for supporting an inner peripheral edge 46 of a centre hole H of the optical disk D, as shown in FIG. 16, and the plurality of movable portions 50 have a centering function that it is formed as an elastically displaceable, or elastically movable, element long-cantilever supported along the outer peripheral surface of the centering portion 40 to be elastically displaced to coincide the rotational centre of the optical disk D with the centre shaft CL of the turntable 12.

Further, on the lower end side of the centering portion 40 is provided a plate spring 460 as a return assisting member for returning the movable portion 50 elastically deformed to an initial position. For example, the plate spring 460 has a function that in the state that it is formed, for example, from a thin metal sheet, and the optical disk D is mounted on the movable portion 50, when the plate spring 60 is elastically deformed in a direction of arrow R1 in FIG. 16 together with the movable portion 50, and the optical disk D is removed from the turntable 12, the movable portion 50 is forcibly returned in a direction of arrow R2 in FIG. 16 so as to assume the initial state when the optical disk D is not mounted shown in FIG. 16.

The plate spring 460 used here is formed by punching a thin sheet-like metal plate formed of stainless steel (SUS301-CSP, SUS304-CSP) for a spring, or bronze for a spring (C5210P-1/2H) or the like as shown in FIGS. 15 and 19. That is, the plate spring 460 is formed by punching a disk-like thin sheet metal plate by way of press, a plurality of, for example, five support elements 462 are projected at equal intervals around the outer peripheral portion of the ring-like portion 61 bored with a centre hole 461a, and a single detent element 463 is projected.

The plate spring 460 used here also has a function that each support element 462 elastically deformably supports the lower end of the movable portion 50 at a corresponding position. Each support element 462 is formed substantially into the shape of T as shown in FIGS. 15 and 19. Further, one detent element 463 is formed between the support elements 462, 462 adjacent to each other. The detent element 463 has a function that it is engaged with an engaging projection 400 projected on the lower end surface of the fixed portion 48 to thereby attain the detention of the plate spring 460 with respect to the centering portion 40. The plate spring 460 supports the lower end of the movable portion 50 in the state that the engaging projection 400 is engaged with the detent element 463. It is noted that the engaging projection 400 attains anti-slipping of the detent element 463 by melting and deforming the extreme end thereof as necessary.

The turntable 12 having the thus formed plate spring 460 mounted thereon is mounted so as to be rotated integral with the drive shaft 14a by pressing the centre hole 461a provided in the centre portion of the plate spring 460 and the shaft insert hole 42a provided in the centering portion 40 into the drive shaft 14a of the drive motor 14.

The turntable used for rotating and driving the optical disk D is formed with a plurality of fixed portions or fixed diametrical portions with which the centre hole H provided in the optical disk D engages. The fixed portion (fixed diametrical portion) is formed in a proper diameter suppressing eccentricity with a centre hole of the turn table fitted in the drive shaft of the drive motor to be a rotational centre as a reference. In the turntable, in a case where volume production is actually made, a working error occurs in the diameter of the centre hole, likely failing to attain accurate centering for coinciding the rotational centre of the turntable with the rotational centre of the optical disk D when the optical disk D is mounted on the turntable.

In the present invention, the plate spring is provided in order to absorb the working error of the turntable to accurately coincide the rotational centre of the turn table with the rotational centre of the optical disk D. The outer peripheral diameter of the movable portion for attaining the centering of the optical disk D provided in the centering portion is formed to be somewhat larger than a reference diameter of the centre hole H of the optical disk D. By forming the movable portion as described above, when the optical disk D is mounted, the centering for coinciding the rotational centre with the rotational centre of the turntable is realized.

In the present invention, the movable portion for attaining the centering of the optical disk D mounted with respect to the turntable is able to prevent occurrence of creep phenomenon caused by repetition of flexure deformation since the elastic return is assisted by the plate spring. Since the creep phenomenon of the movable portion is suppressed by the plate spring, the turntable provided in the movable portion for centering the optical disk can be formed of synthetic resin widely used to attain the reduction in manufacturing cost.

It is noted that since the plate spring for applying the return assisting forces to the movable portion for attaining the centering of the optical disk D used in the present invention can be basically formed into a flat shape, the dimensional accuracy or the spring force is stabilized, and the operating reliance when the movable portion is returned is high.

Since the turntable according to the present invention is provided with the movable portion for attaining the centering of the optical disk D mounted and the plate spring for applying the elastic force to the movable portion, the centering portion can be pressed into contact with the centre hole H of the optical disk D with the adequate elastic force, the vibration applied to the optical disk D when rotated and driven can be absorbed to make the vibration resistance excellent.

Further, since the turntable shown in FIGS. 15 and 16 is mounted by the plate spring 460 into the drive shaft 14a of the drive motor 14, the detention with respect to the drive shaft 14a can be attained, and the turntable can be integrated with the drive shaft 14a positively.

Figure 20A:
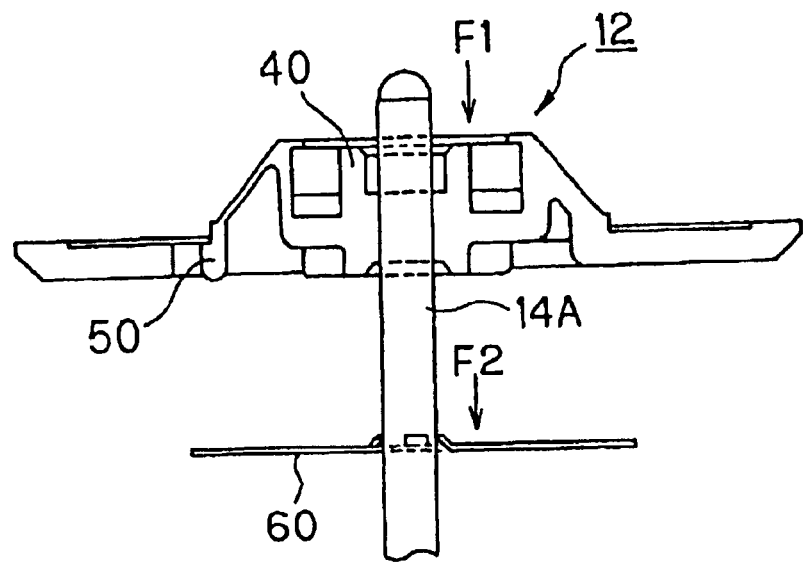
FIG. 20A and FIG. 20B are respectively side views showing the enhancement of the load resistance of the turntable.
Figure 20B:
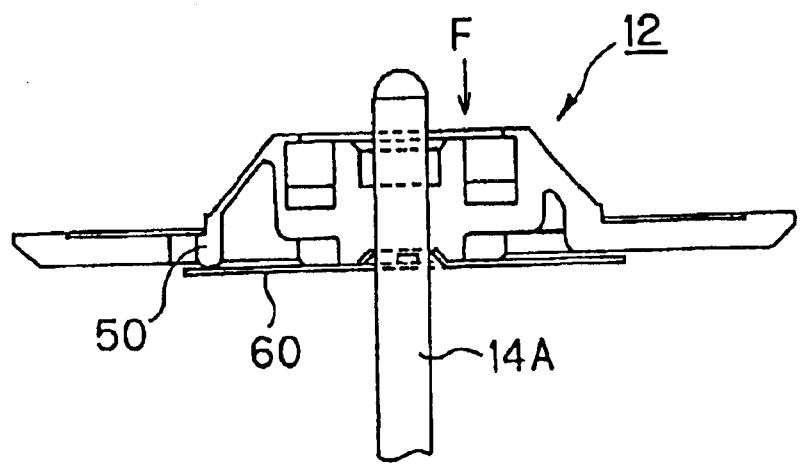

Incidentally, in a case where the turntable 12 is mounted by the plate spring 60 into the drive shaft 14a of the drive motor 14, as shown in FIGS. 20A and 20B, the press allowance of the turntable 12 with respect to the drive shaft 14a cannot be increased.

As shown in FIG. 20A, let F1 (N) be the re-press force of the turntable 12, and F2 (N) be the re-press force of the plate spring 60, then the re-press input F in a combination of both parts is F=F1+F2 as shown in FIG. 20B. The re-press force means the load resistance.

Even in a case where the press allowance of the turntable 12 cannot be prolonged due to the presence of the dimensional restriction in the height direction, the plate spring 60 is made of metal, and even thin thickness, the sufficient re-press force, that is, the load resistance can be obtained. Thereby, there is an advantage that as compared with the use of only the turntable, when the plate spring is used, the load resistance increases.

Further, even in the turntable in which the plate spring is secured directly to the shaft portion provided integral with the centering portion as shown in FIGS. 4 and 5, or in a case where the plate spring is secured directly to the drive shaft of the drive motor, the plate spring is changed in position in the axial direction of the shaft portion or in the axial direction of the drive shaft whereby the support element of the plate spring is able to adjust the magnitude of the support force applied to the movable portion. The spring force applied to the movable portion can be suitably changed according to the mounting position of the plate spring.

Still another embodiment of the turntable 12 according to the present invention will be explained below with reference to FIGS. 21 to 25.

Figure 21:
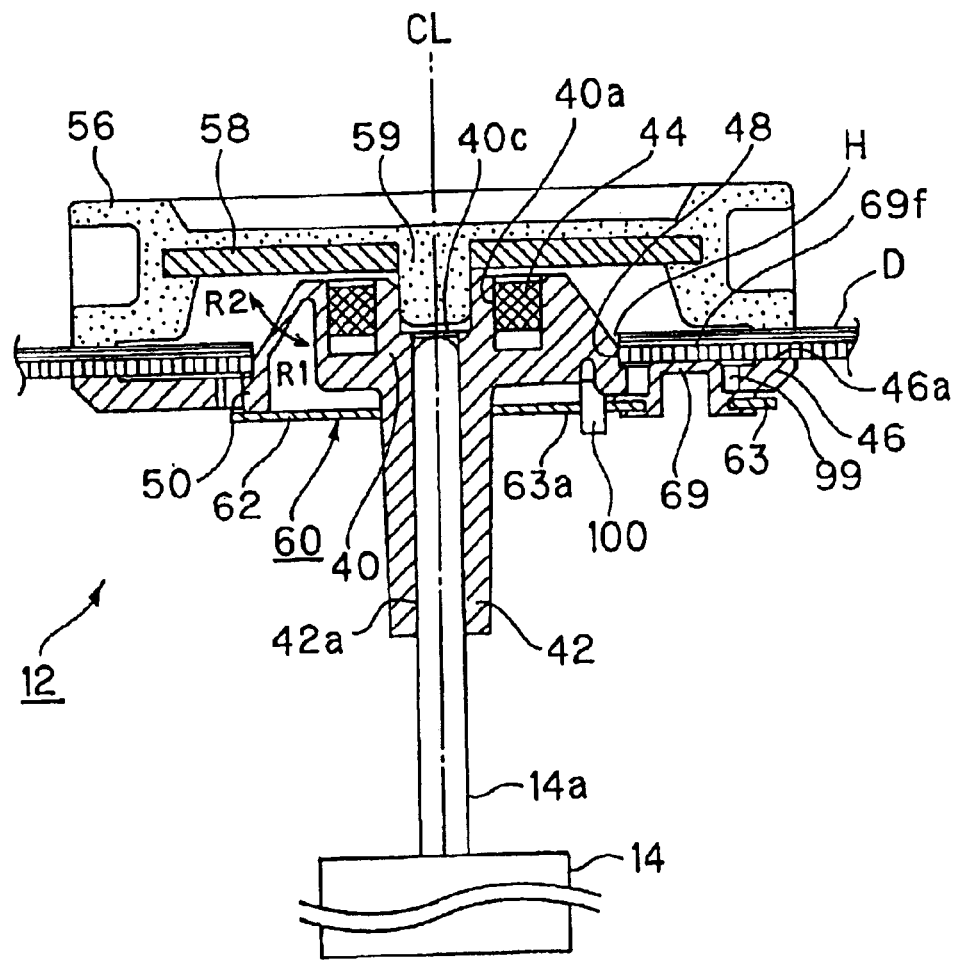
FIG. 21 is a sectional view showing a further example of the turntable according to the present invention.
Figure 22:
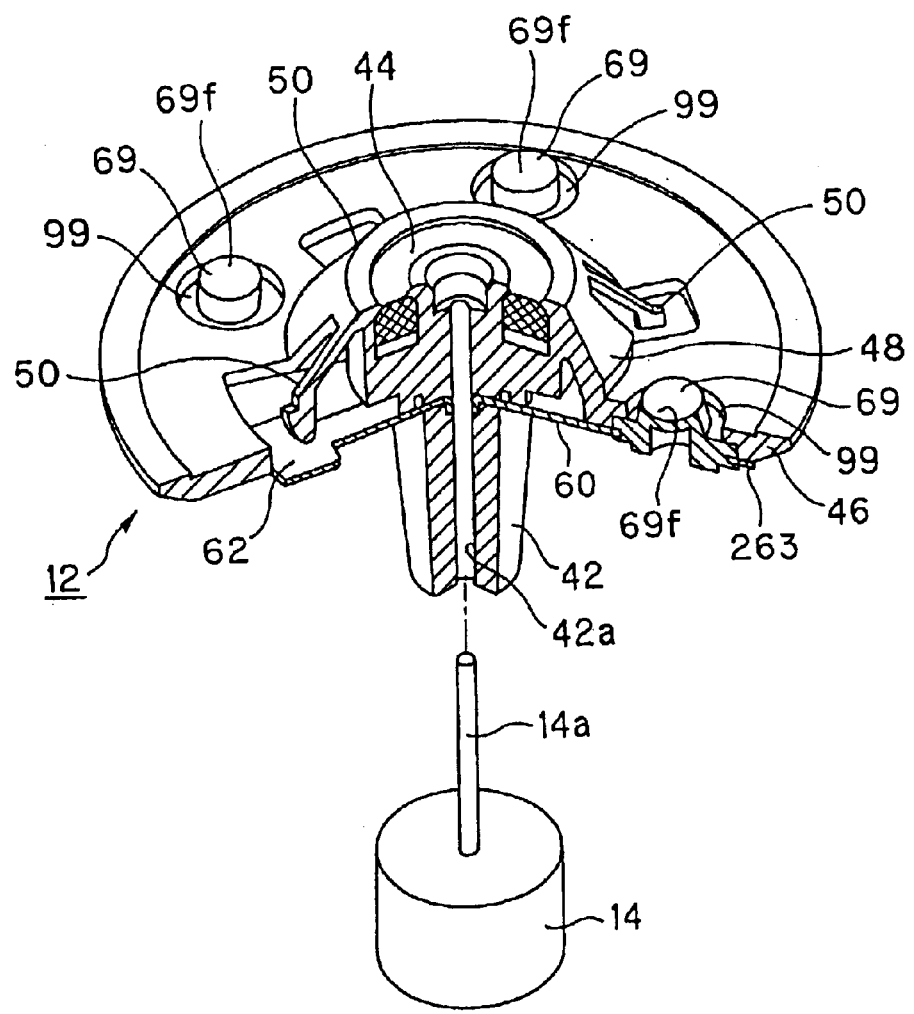
FIG. 22 is a perspective view partly cutaway.
Figure 23:
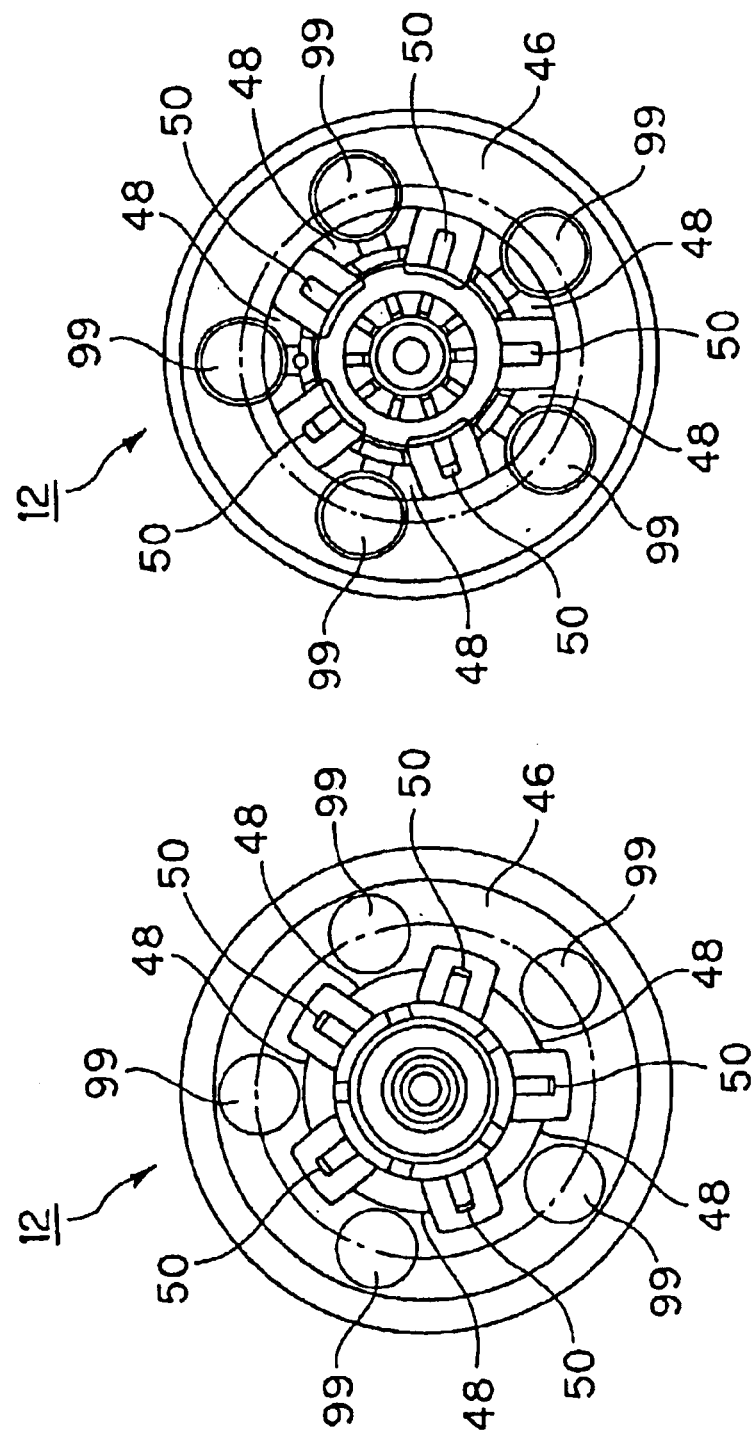
FIG. 23A is a plan view thereof.
FIG. 23B is a bottom view thereof.
Figure 24:
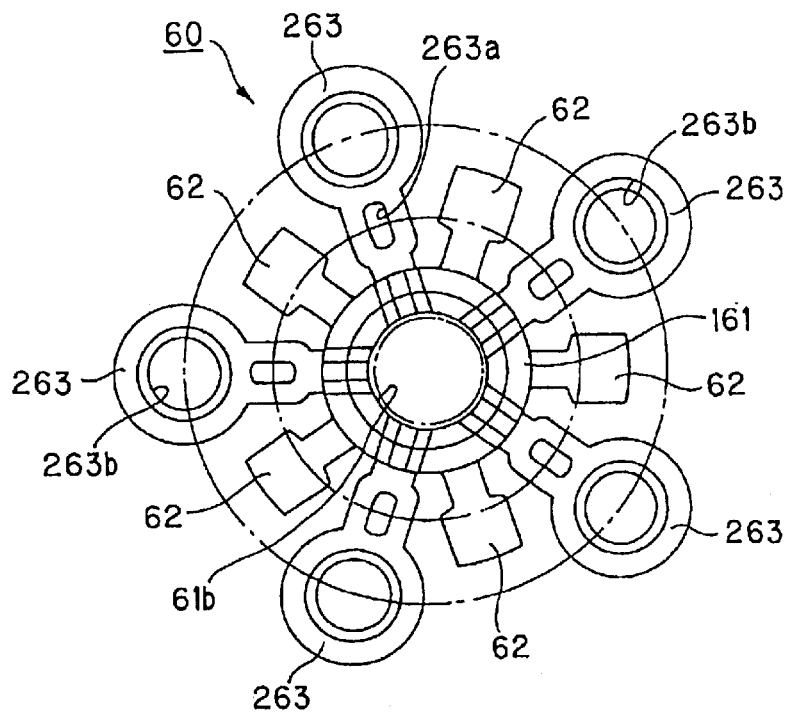
FIG. 24 is a plan view showing the plate spring sued in the turntable shown in FIG. 21.

As shown in FIG. 24, the plate spring 60 used here is formed by punching a disk-like thin sheet metal plate by way of press or the like, a plurality of, for example, five support elements 62 are projected at equal intervals in a peripheral direction on the outer peripheral side of the ring-like portion 61 bored with a centre hole 61a, and a slip preventive portion support element 263 is formed between the support elements 62. Each slip preventive portion support element 263 is formed in the middle portion with an engaging hole 263a with which is engaged an engaging projection 100 projected on the bottom side of the centering portion 40. This plate spring 60 is mounted on the bottom surface of the centering portion 46 by fitting the centre hole 61a into the shaft portion 42 of the turntable 12, as shown in FIGS. 21 and 22. At this time, the extreme end of the engaging projection 100 is thermally deformed whereby the anti-slipping of the engaging hole 263a from the engaging projection 100 is attained to prevent the plate spring 60 from being disengaged from the centering portion 40.

Figure 25:
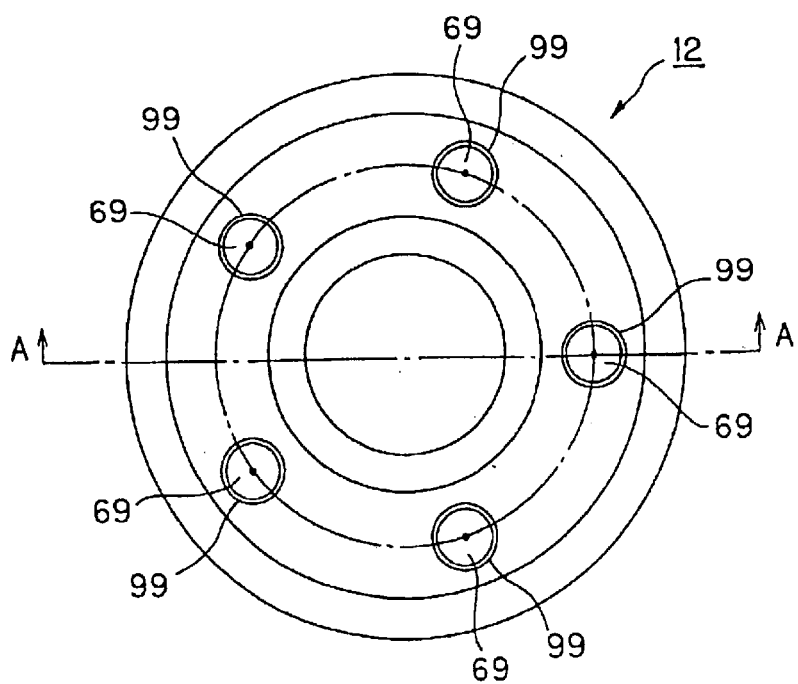
FIG. 25 is a plan view showing a part of the turntable shown in FIG. 21.
Figure 26:
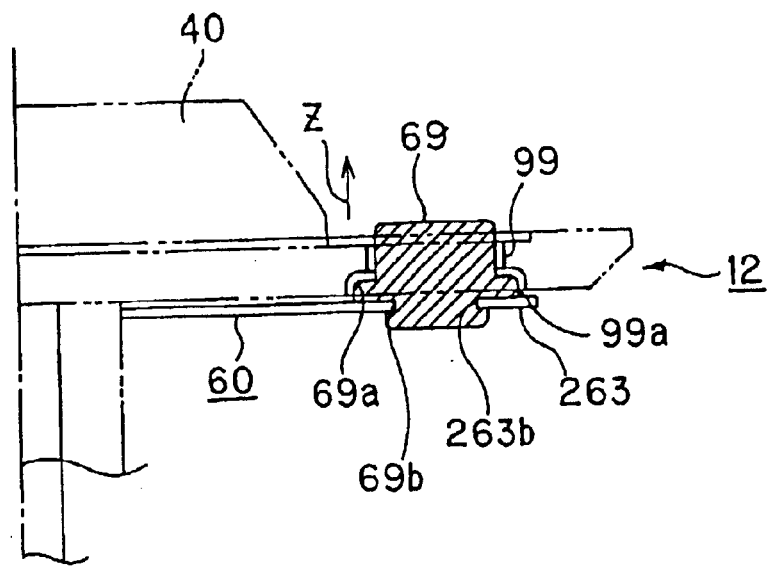
FIG. 26 is a sectional view taken on line A—A of FIG. 25.

The support element 62 provided on the plate spring 60 is a portion for supporting the free end of the movable portion 50 provided in the centering portion 40, and the slip preventive portion support element 263 is a portion for supporting the slip preventive portion 69. The slip preventive portion 69 supported on the slip preventive portion support element 263 is molded by resin, for example, such as an elastomer. The slip preventive portion 69 is projected by a fixed amount on the place surface side of the optical disk D from a hole 99 provided in the turntable 12. The slip preventive portion 69 is formed substantially into the shape of U in section, as shown in FIGS. 21 and 22, and is mounted so as to fit in the slip preventive portion support element 263 of the plate spring 60. FIG. 25 shows the slip preventive portion 69, the hole 99 and so on, and FIG. 26 is a sectional view taken on line A—A of FIG. 25. The slip preventive portion 69 is mounted to be projected in the direction of arrow Z in FIG. 26 from the hole 99 of the turntable 12, and the optical disk D is placed on the slip preventive portion 69 as shown in FIG. 21.

The slip preventive portion 69 has a flange portion 69a projected on the outer peripheral surface engaged with an engaging concave portion 99a formed on the bottom side of the turntable 12 as shown in FIG. 26. Further, the slip preventive portion 69 has an engaging groove 69b formed in the outer peripheral surface on the base end side engaged with the inner circumference of an engaging hole 263b bored in the slip preventive portion support element 263 of the plate spring 60. Thereby, the slip preventive portion 69 is held and secured between the turntable 12 and the plate spring 60.

Figure 27:
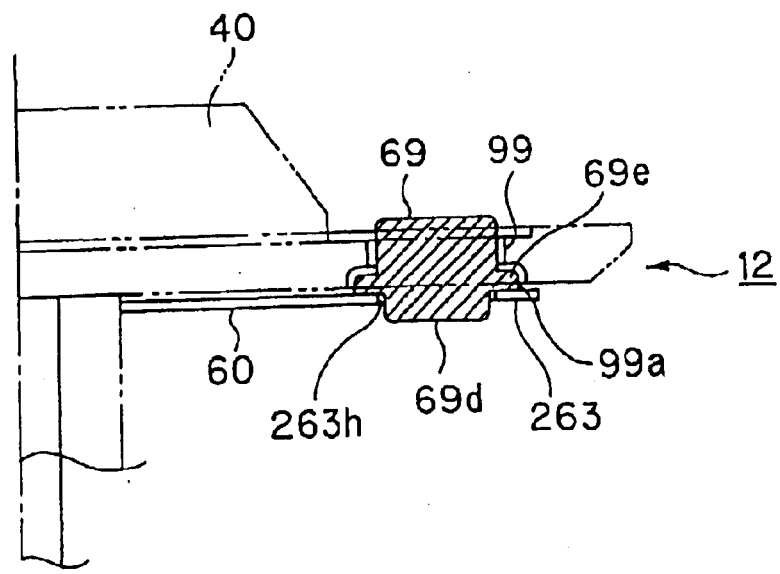
FIG. 27 is a sectional view showing another example of a part corresponding to the section taken on line A—A of FIG. 25.

FIG. 27 shows a further example of the slip preventive portion 69. A projection portion 69d of the slip preventive portion 69 is inserted into a hole 263h provided in the slip preventive portion support element 263. A flange portion 69e formed on the outer circumference of the slip preventive portion 69 is engaged with an engaging concave portion 99a formed on the bottom surface of the turntable 12. Thereby, the slip preventive portion 69 is held in the form sandwiched between the turntable 12 and the plate spring 60.

The aforementioned slip preventive portion 69 has the following function. That is, an upper surface 69f of each slip preventive portion 69 is slightly projected from the upper surface 46a of the receiving portion 46 of the optical disk D. The upper surface 69f of the slip preventive portion 69 supports the lower surface of the optical disk D by way of the frictional force so that the optical disk D may not be slipped with respect to the turntable 12 at the time of rotation.

FIG. 23A is a plan view of the turntable 12 on which the slip preventive portion 69 is provided, and FIG. 23B is a bottom view thereof.

Figure 28:
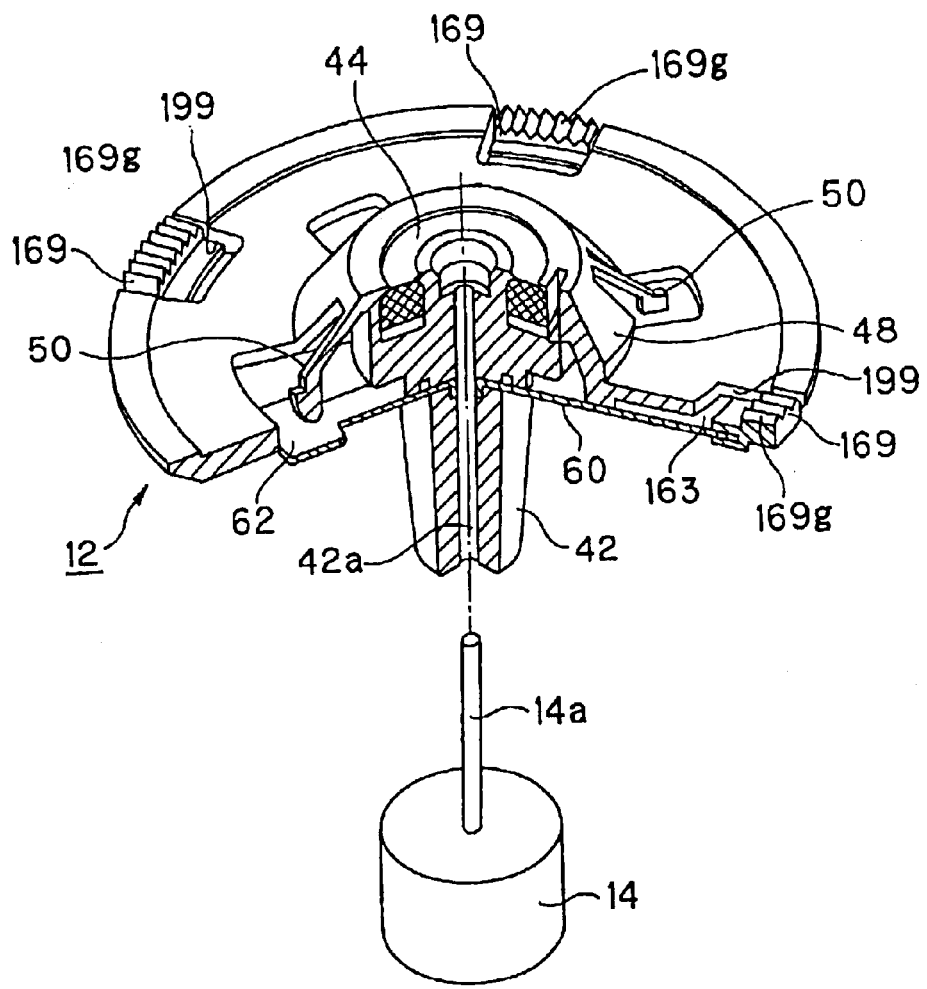
FIG. 28 is a sectional view showing still another example of the turntable according to the present invention.

FIG. 28 shows another embodiment of the turntable 12 according to the present invention. The turntable 12 shown in FIG. 28 has the nearly same construction as that shown in FIG. 22, but is different in shape of a slip preventive portion 169. In the ensuing explanation, parts common to those of the turntable shown in FIG. 22 are indicated by common reference numerals, detailed explanation of which is omitted. The turntable 12 shown in FIG. 28 is mounted so as to be rotated integral with the drive shaft 14a by pressing the shaft insert hole 42a of the shaft portion 42 provided integral with the centering portion 40 into the drive shaft 14a of the drive motor 14.

A slip preventive portion 169 is mounted on the slip preventive portion support element 163 of the plate spring 60 by way of fitting. On the upper surface of the slip preventive portion 169 is provided a waveform or concavo-convex type contact portion 169g in order to prevent the optical disk from slipping. The slip preventive portion 169 is provided so as to face to an opening 199 provided in the turntable 12. The opening 199 has the size slightly larger than the slip preventive portion 169. The function of the slip preventive portion 169 is nearly the same as that of the slip preventive portion 69 described above.

Figure 29:
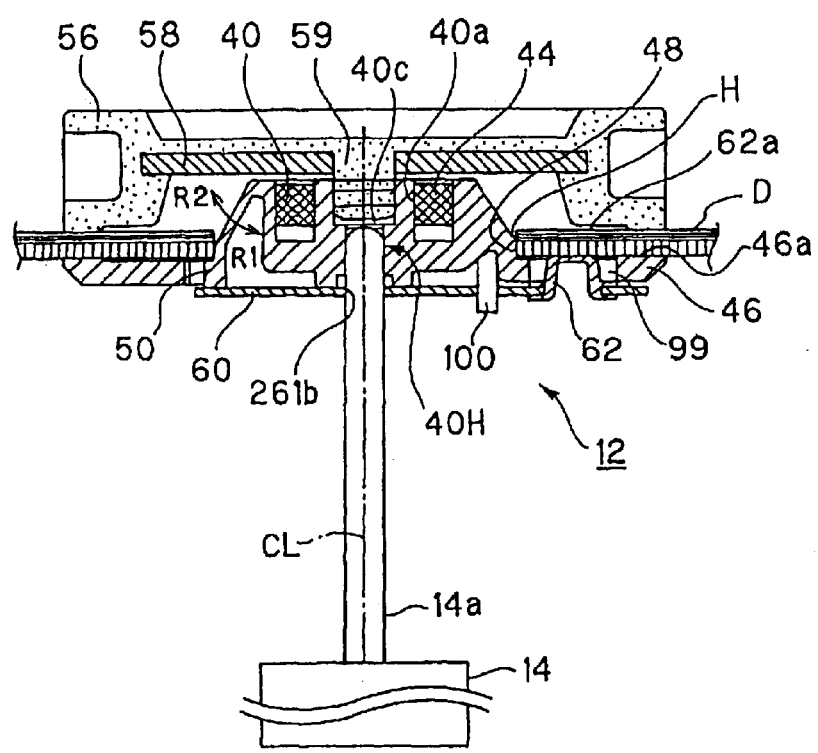
FIG. 29 is a sectional view showing a further example of the turntable according to the present invention.

FIG. 29 shows still another embodiment of the turntable 12 according to the present invention. The turntable shown in FIG. 29 is mounted so as to be rotated integral with the drive shaft 14a by pressing an insert hole 40h provided in the centre portion of the centering portion 40 into the drive shaft 14a of the drive motor 14.

Figure 30:
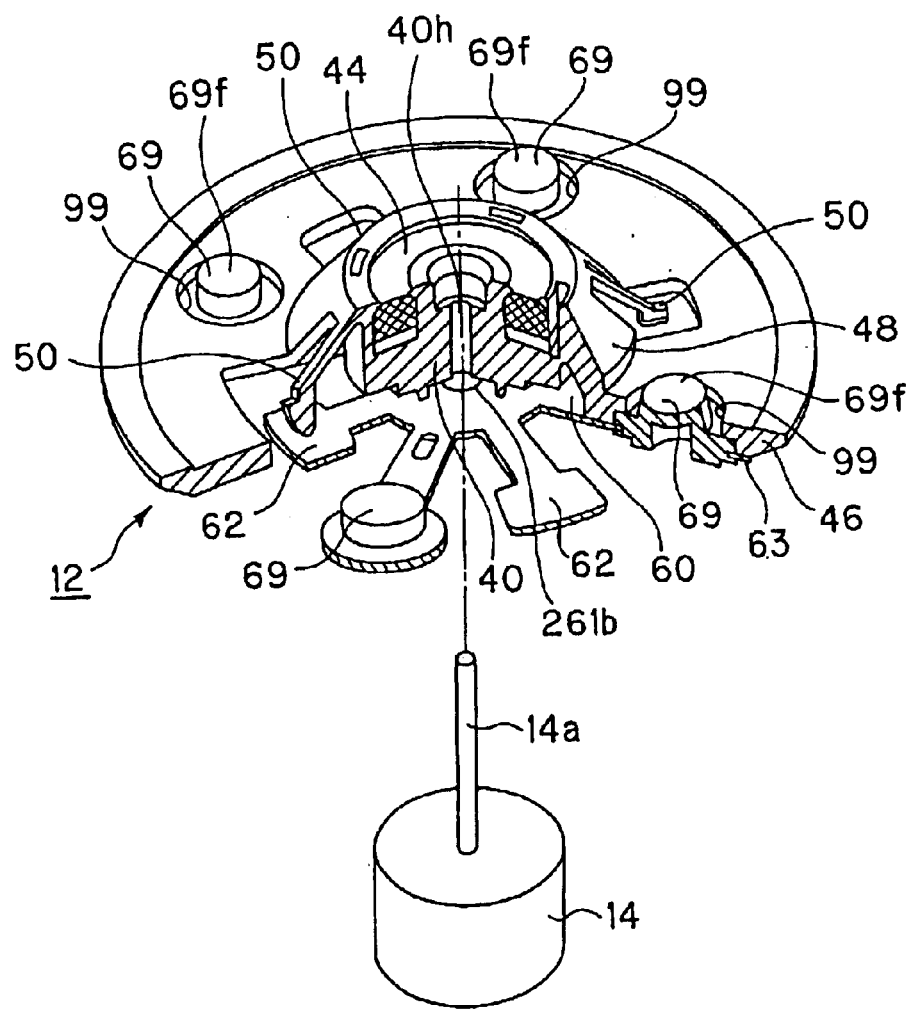
FIG. 30 is a perspective view showing a part of the turntable in a cutaway form.
Figure 31:
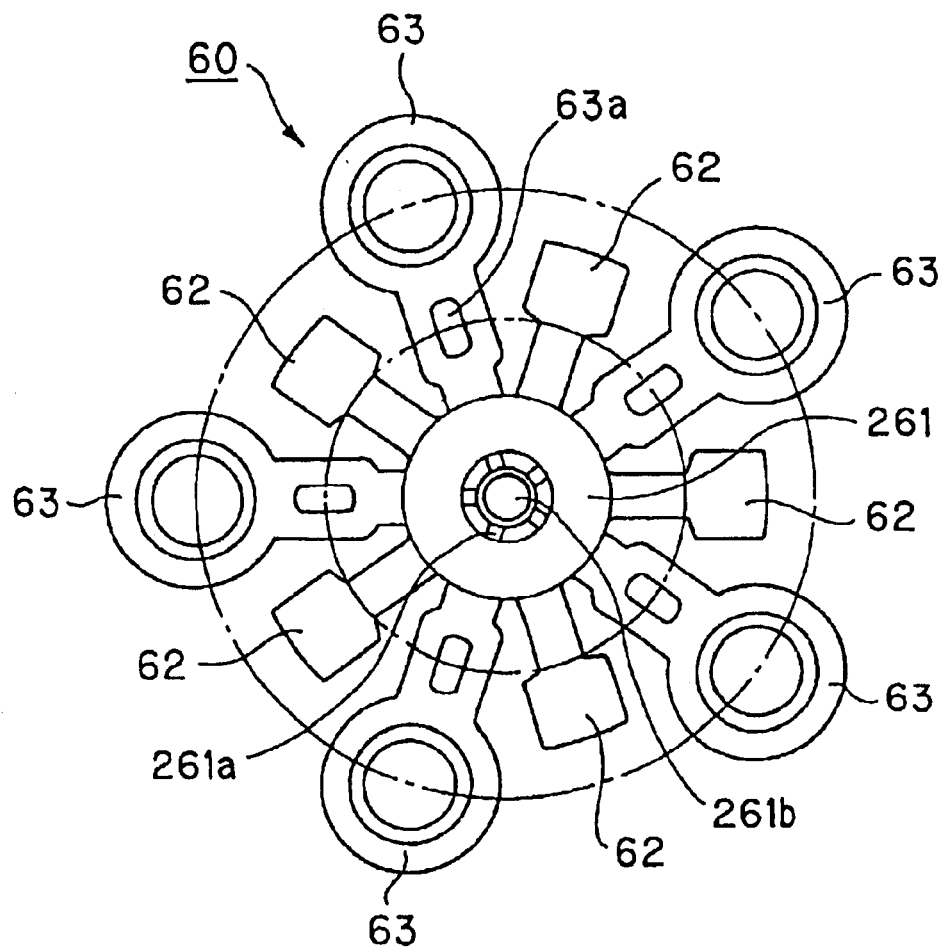
FIG. 31 is a plan view thereof.

The turntable shown in FIGS. 30 and 31 are common in constitutional elements except the shaft portion and the plate spring 60, detailed description of is therefore omitted.

A ring-like portion 261 in the centre portion of the plate spring 60 shown in FIG. 31 has a concave portion 261a in the central portion thereof. A small diameter portion 261b is formed in the centre portion of the ring-like portion 261. The drive shaft 14a of the drive motor 14 shown in FIGS. 29 and 30 is pressed into the insert hole 261b. The plate spring 60 is directly pressed into the drive shaft 14a of the drive motor 14. The ring-like portion 261 has five support elements 62 and five slip preventive portion support elements 63. The slip preventive portion support element 63 has an engaging hole 63a, into which an engaging projection 100 shown in FIG. 29 is fitted. The engaging projection 100 is deposited as necessary so that the plate spring 60 is secured also to the centering portion 40 of the turntable 12.

Since the turntable according to the present invention can be formed using a synthetic resin material excellent in rigidity and molding accuracy, the turntable can be mounted on the drive shaft of the drive motor with high accuracy, and the optical disk can be mounted with accurate centering. Further, since the movable portion for centering the optical disk mounted is elastically biased by the plate spring, the optical disk mounted is supported by the elastic force, thus providing the great vibration proof effect with respect to the external vibrations.

Further, in the present invention, color of the return assisting member (plate spring) provided on the turntable and the slip preventive portion is changed from color of other turntable portions, whereby the external design can be adjusted. Further, the return assisting member and the slip preventive portion are coloured and the other portions of the turntable are transparent whereby the magnet inserted into the centering portion can be viewed from the outside. The magnet is subjected to the insert molding in the centering portion to thereby enable reduction in manufacturing cost and prevent the magnet from peeling off to enhance the mounting reliability.

Since the surface in contact with the optical disk of the slip preventive portion is formed to be higher than the upper surface of the turntable, that is, the place surface of the optical disk, the slip preventive effect of the optical disk is great as compared with the turntable manufactured in close contact with the optical disk surface and of normal quality by the friction force thereof, making use of elasticity such as rubber of elastomer.

The present invention is not limited to the aforementioned embodiments, but can be applied to not only the optical disk or the optical magnetic disk but also other disk-like information recording media.

Industrial Applicability

As described above, according to the present invention, there can be manufactured easily and inexpensively a turntable capable of rotating and driving accurately, when a disk-like recording medium is mounted, the medium while preventing eccentricity of the recording medium.

Further, there can be constituted a turntable capable of rotating and driving a disk-like recording medium in the form of accurate integration.

What is claimed is:

1. A turntable for mounting a disk-like information recording medium to rotate it continuously, comprising:

a fixed portion fitted in a centre hole of said disk-like information recording medium;

a movable portion fitted in said centre hole with said fixed portion as a reference to be elastically deformed to correct an eccentricity when said disk-like information recording medium is mounted;

a return assisting member for returning, when said disk-like information recording medium is not mounted, said movable portion from a position when said disk-like information recording medium is mounted to a position when said disk-like information recording medium is not mounted; and a slip prevention portion provided on said return assisting member and coming into contact with said disk-like recording medium to thereby prevent said disk-like recording medium from slipping.

2. An optical disk device having a turntable for mounting a disk-like information recording medium to rotate it continuously, said turntable comprising:

a fixed portion fitted in a hole in a centre hole of said disk-like information recording medium;

a movable portion fitted in said centre hole with said fixed portion as a reference to be elastically deformed to correct an eccentricity when said disk-like information recording medium is mounted;

a return assisting member for returning, when said disk-like information recording medium is not mounted, said movable portion from a position when said disk-like information recording medium is mounted to a position when said disk-like information recording medium is not mounted; and a slip prevention portion provided on said return assisting member and coming into contact with said disk-like recording medium to thereby prevent said disk-like recording medium from slipping.

* * * * *